United States Patent
Kobayashi et al.

(10) Patent No.: US 11,833,990 B2
(45) Date of Patent: Dec. 5, 2023

(54) SIDE AIRBAG DEVICE, VEHICLE SEAT PROVIDED WITH SAME, AND METHOD FOR MANUFACTURING SIDE AIRBAG DEVICE

(71) Applicants: Autoliv Development AB, Vargarda (SE); Yuto Kobayashi, Kanagawa (JP); Hiroyuki Shima, Kanagawa (JP); Tsutomu Sakurai, Kanagawa (JP)

(72) Inventors: Yuto Kobayashi, Kanagawa (JP); Hiroyuki Shima, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 148 days.

(21) Appl. No.: 17/309,762

(22) PCT Filed: Oct. 18, 2019

(86) PCT No.: PCT/JP2019/041061
§ 371 (c)(1),
(2) Date: Jun. 17, 2021

(87) PCT Pub. No.: WO2020/129386
PCT Pub. Date: Jun. 25, 2020

(65) Prior Publication Data
US 2022/0055570 A1    Feb. 24, 2022

(30) Foreign Application Priority Data
Dec. 21, 2018   (JP) ................................ 2018-240381

(51) Int. Cl.
*B60R 21/231*   (2011.01)
*B60R 21/207*   (2006.01)
(Continued)

(52) U.S. Cl.
CPC ...... *B60R 21/23138* (2013.01); *B60R 21/207* (2013.01); *B60R 21/215* (2013.01);
(Continued)

(58) Field of Classification Search
CPC ............ B60R 21/23138; B60R 21/207; B60R 21/215; B60R 21/2171; B60R 21/233;
(Continued)

(56) References Cited

U.S. PATENT DOCUMENTS

2007/0273129 A1* 11/2007 Inoue .................... B60R 21/207
280/730.2
2012/0038135 A1*  2/2012 Oomori ............. B60R 21/23138
280/730.2
(Continued)

FOREIGN PATENT DOCUMENTS

EP          1810891 A1    7/2007
JP        2006-513083 A    4/2006
(Continued)

OTHER PUBLICATIONS

Kudo, T. JP 5942772 Vehicle seat with side airbag device, Machine English Translation, ip.com (Year: 2016).*
(Continued)

*Primary Examiner* — Karen Beck
(74) *Attorney, Agent, or Firm* — Harness, Dickey & Pierce, P.L.C.; Stephen T. Olson

(57) ABSTRACT

This invention relates to a side airbag device stored inside a vehicle seat and fixed to a side frame. The device includes an airbag that expands and deploys to restrict an occupant; an inflator that supplies expansion gas to the airbag; and a bracket connected to the side frame that holds the airbag and the inflator. The airbag includes a prepush chamber having an inflator stored therein and mainly deploys inside of the side frame; and a main chamber connected to the prepush (Continued)

chamber and mainly deploys forward of the side frame. The bracket includes a first surface oriented in the forward direction of the vehicle; and a second surface oriented to the inside of the seat in the width direction of the vehicle. When the airbag is stored by being folded and/or rolled, at least the main chamber is disposed on the first surface of the bracket.

17 Claims, 24 Drawing Sheets

(51) Int. Cl.
  *B60R 21/215* (2011.01)
  *B60R 21/217* (2011.01)
  *B60R 21/233* (2006.01)
  *B60R 21/237* (2006.01)
(52) U.S. Cl.
  CPC ........ *B60R 21/2171* (2013.01); *B60R 21/233* (2013.01); *B60R 21/237* (2013.01); *B60R 2021/23146* (2013.01); *B60R 2021/23324* (2013.01)
(58) Field of Classification Search
  CPC ........ B60R 21/237; B60R 2021/23146; B60R 2021/23324
  See application file for complete search history.

(56) References Cited

U.S. PATENT DOCUMENTS

| 2013/0119646 | A1 | 5/2013 | Tracht |
| 2013/0147167 | A1 | 6/2013 | Kwon et al. |
| 2018/0222435 | A1* | 8/2018 | Fukawatase ............ B60R 21/26 |
| 2019/0084516 | A1 | 3/2019 | Fukawatase et al. |
| 2020/0262382 | A1* | 8/2020 | Kobayashi ............ B60R 21/217 |
| 2020/0282939 | A1* | 9/2020 | Aki .................. B60R 21/23138 |

FOREIGN PATENT DOCUMENTS

| JP | 2007-314075 | A | | 12/2007 |
| JP | 2008-201172 | A | | 9/2008 |
| JP | 2009-023494 | A | | 2/2009 |
| JP | 2009-241687 | A | | 10/2009 |
| JP | 2014-019393 | A | | 2/2014 |
| JP | 2014-080169 | A | | 5/2014 |
| JP | 2014080169 | A | * | 5/2014 |
| JP | 5942772 | B2 | * | 6/2016 |
| JP | 2018-030399 | A | | 3/2018 |
| JP | 2018-122812 | A | | 8/2018 |
| KR | 20180090749 | A | | 8/2018 |
| WO | 2017/209192 | A1 | | 12/2017 |

OTHER PUBLICATIONS

Korean Office Action dated Jul. 10, 2023 in corresponding Korean Application No. 1020217018878.

* cited by examiner

[FIG. 1]
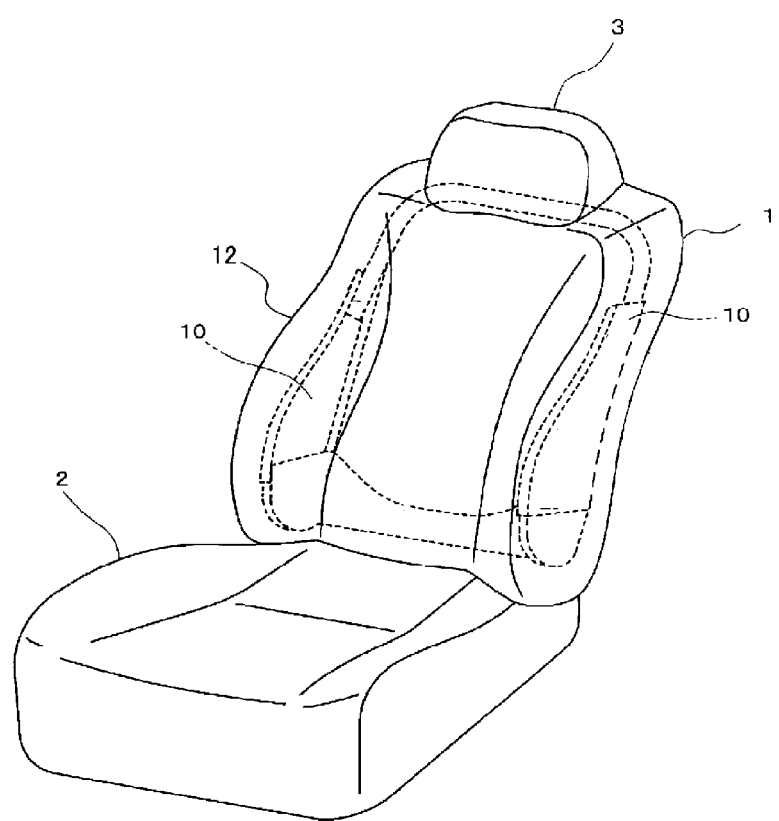

[FIG. 2]
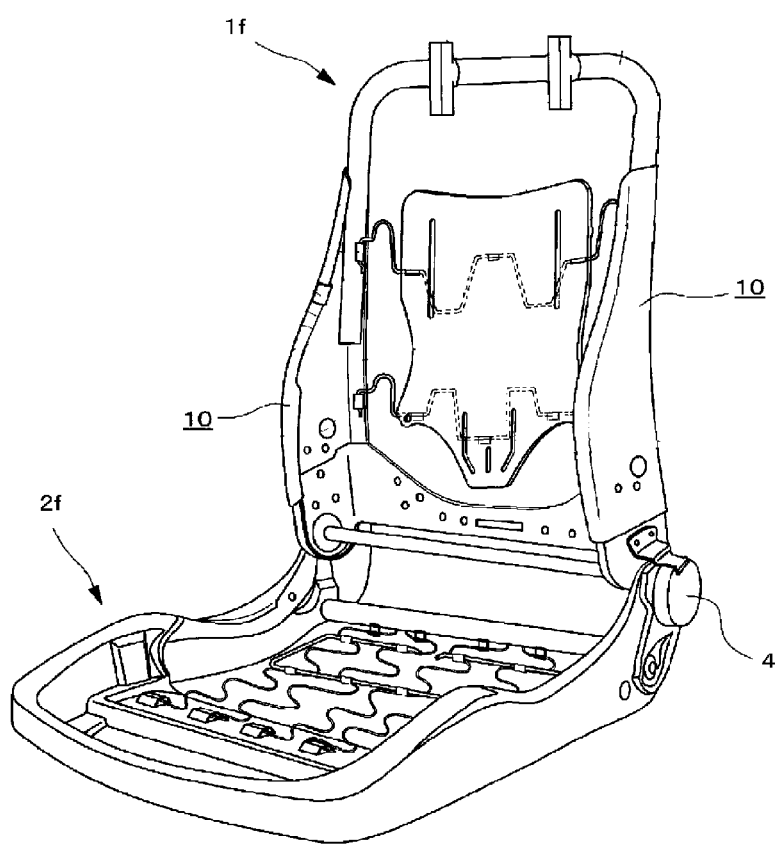

[FIG. 3]
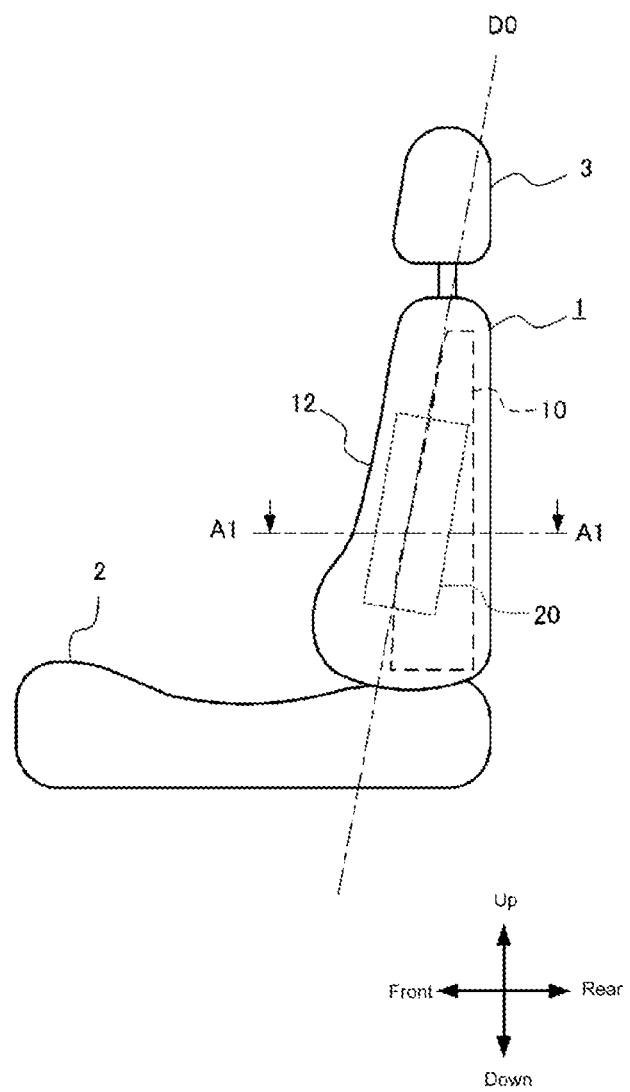

[FIG. 4]
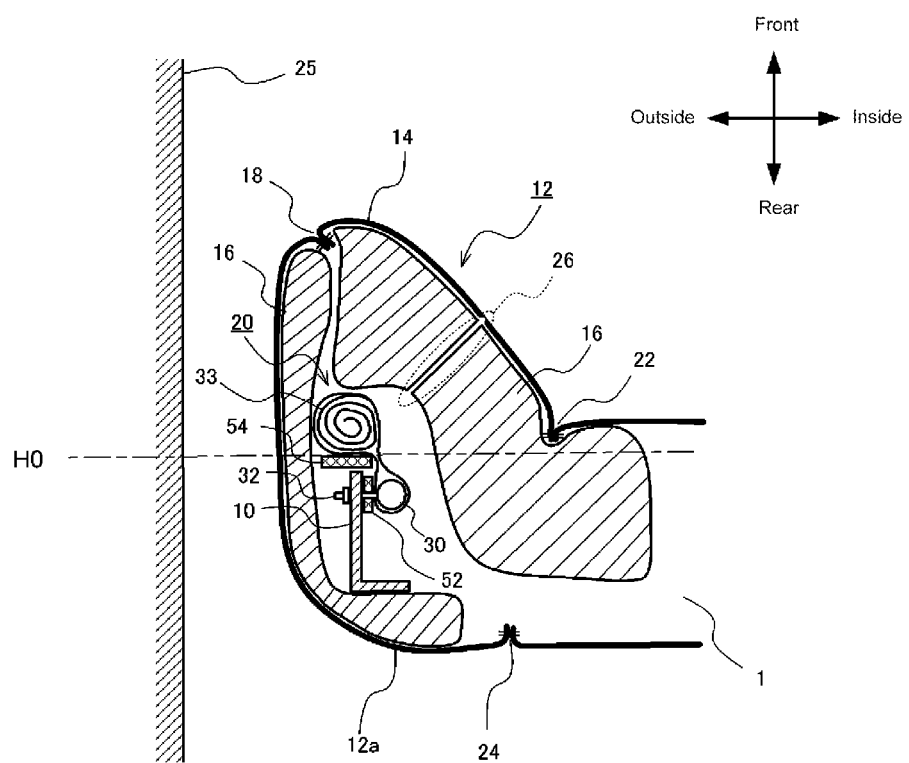
A1-A1 cross section

[FIG. 5]
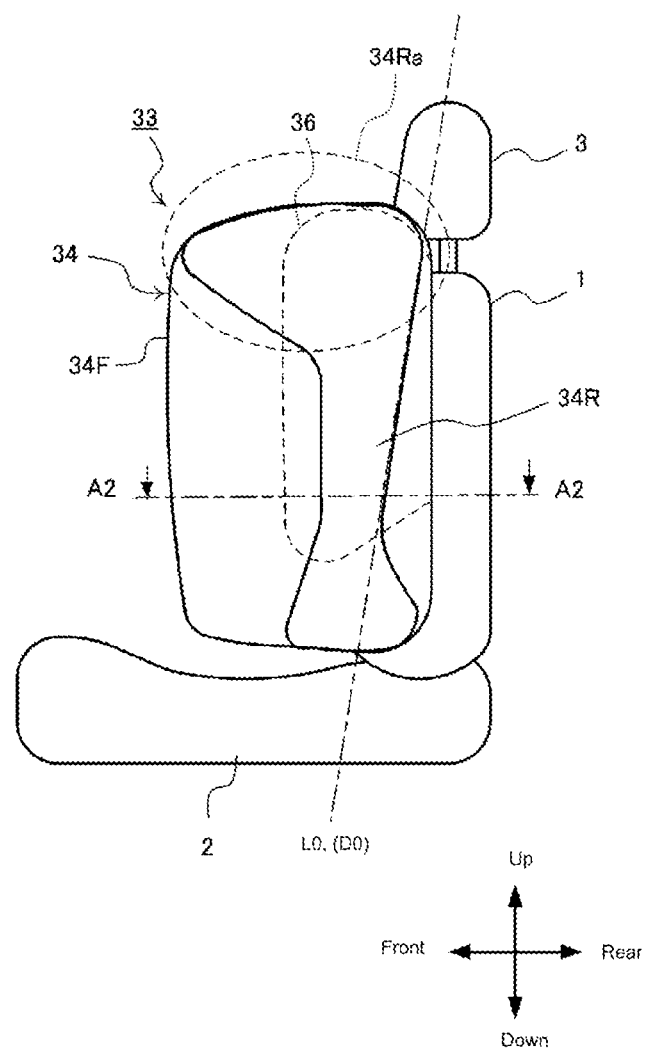

[FIG. 6]
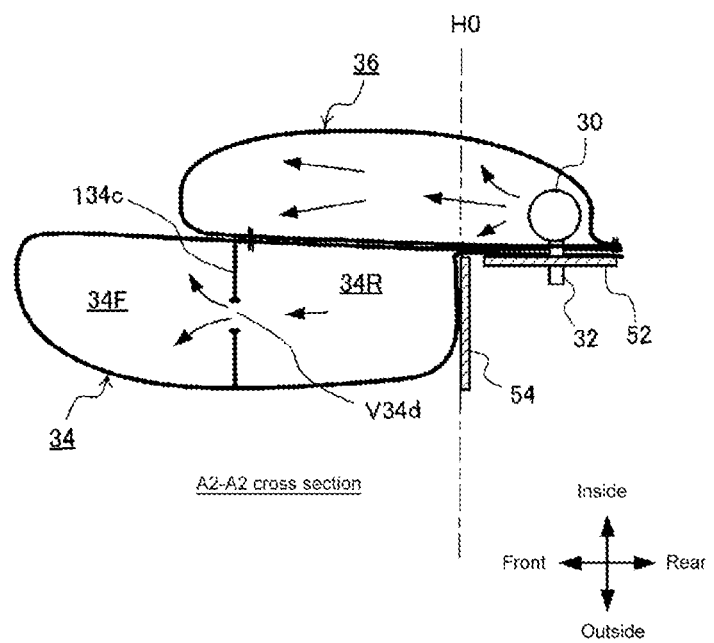

(FIG. 7A)
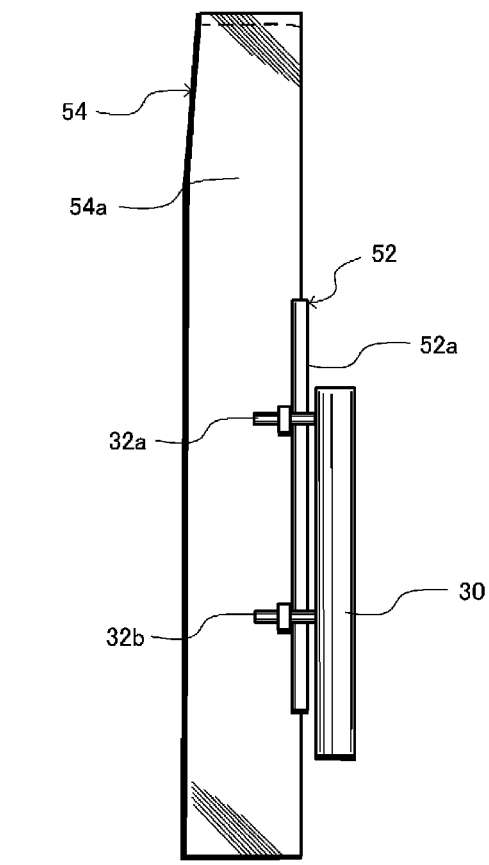
(FIG. 7B)
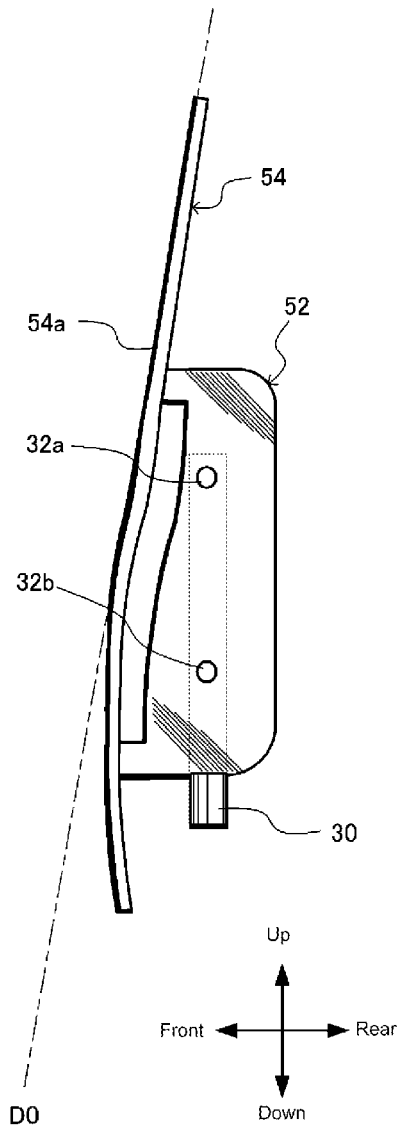

(FIG. 8A)
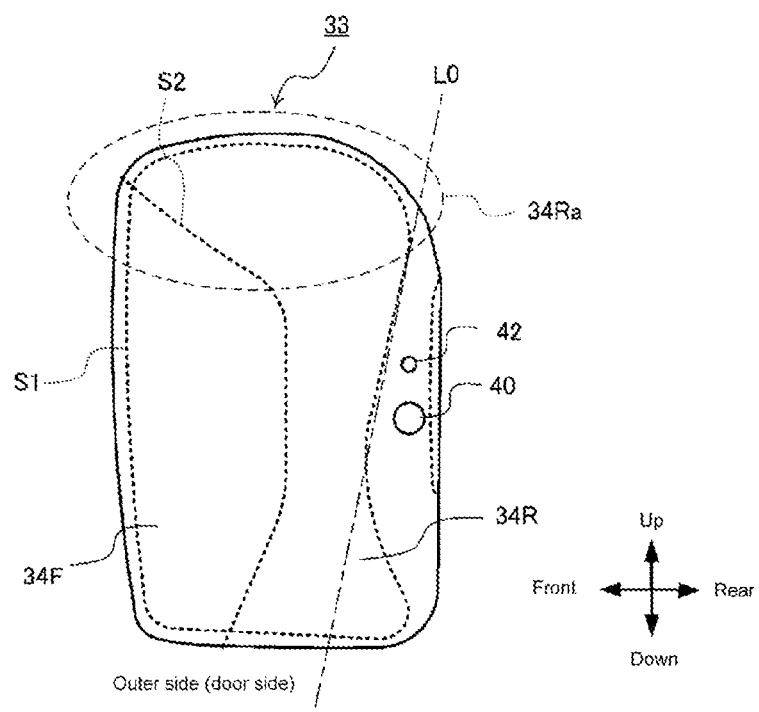
(FIG. 8B)
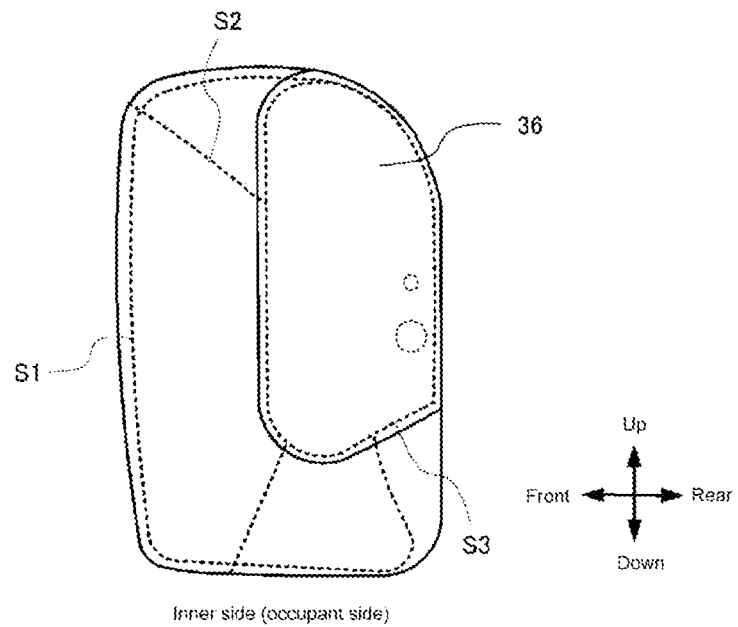

[FIG. 9]
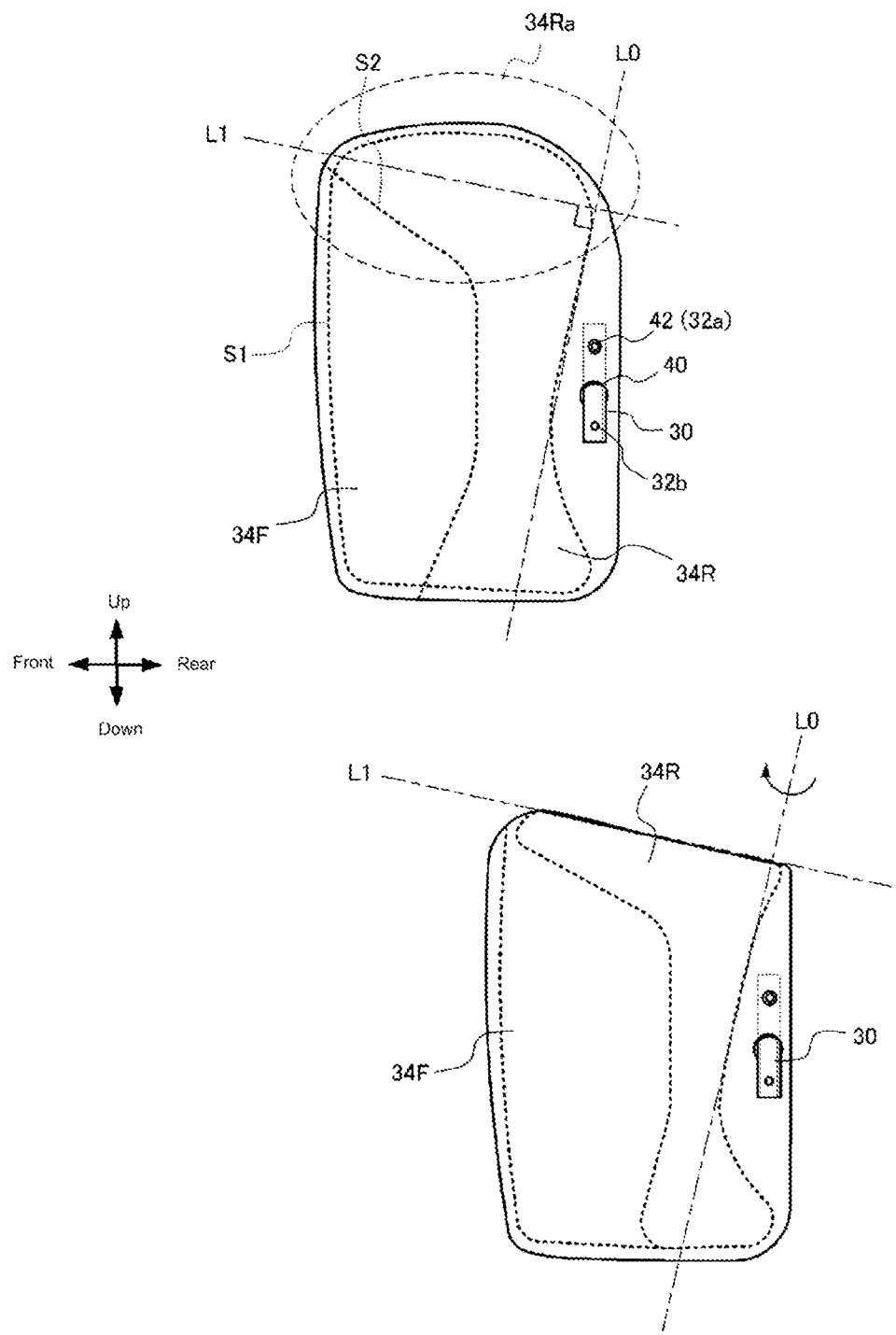

(FIG. 10A)
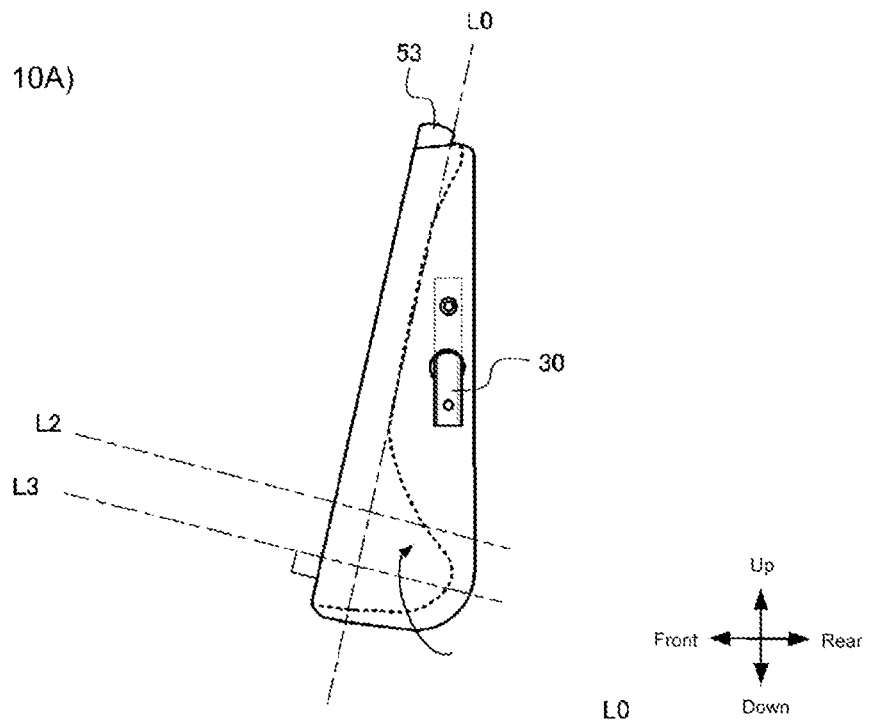
(FIG. 10B)
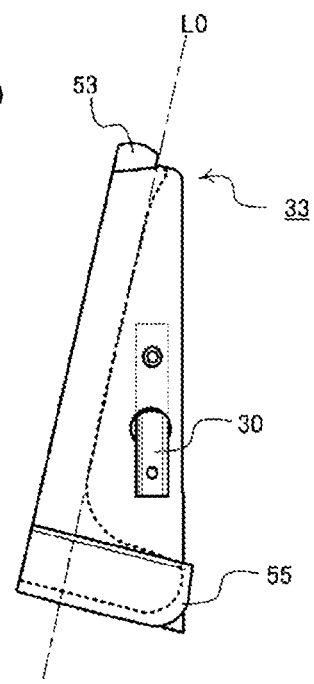

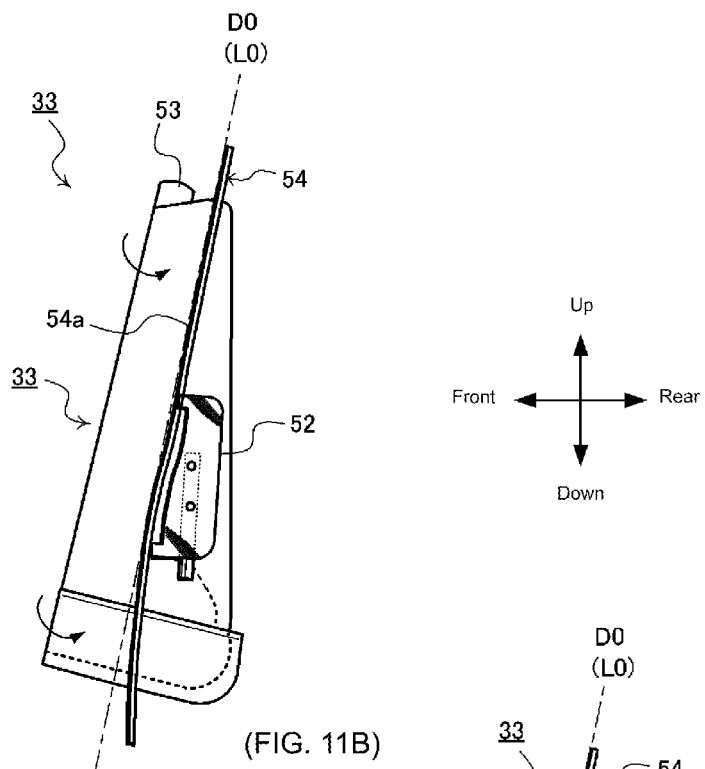
(FIG. 11A)
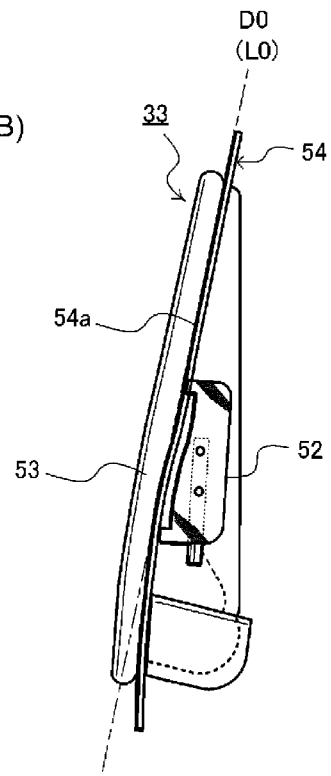
(FIG. 11B)

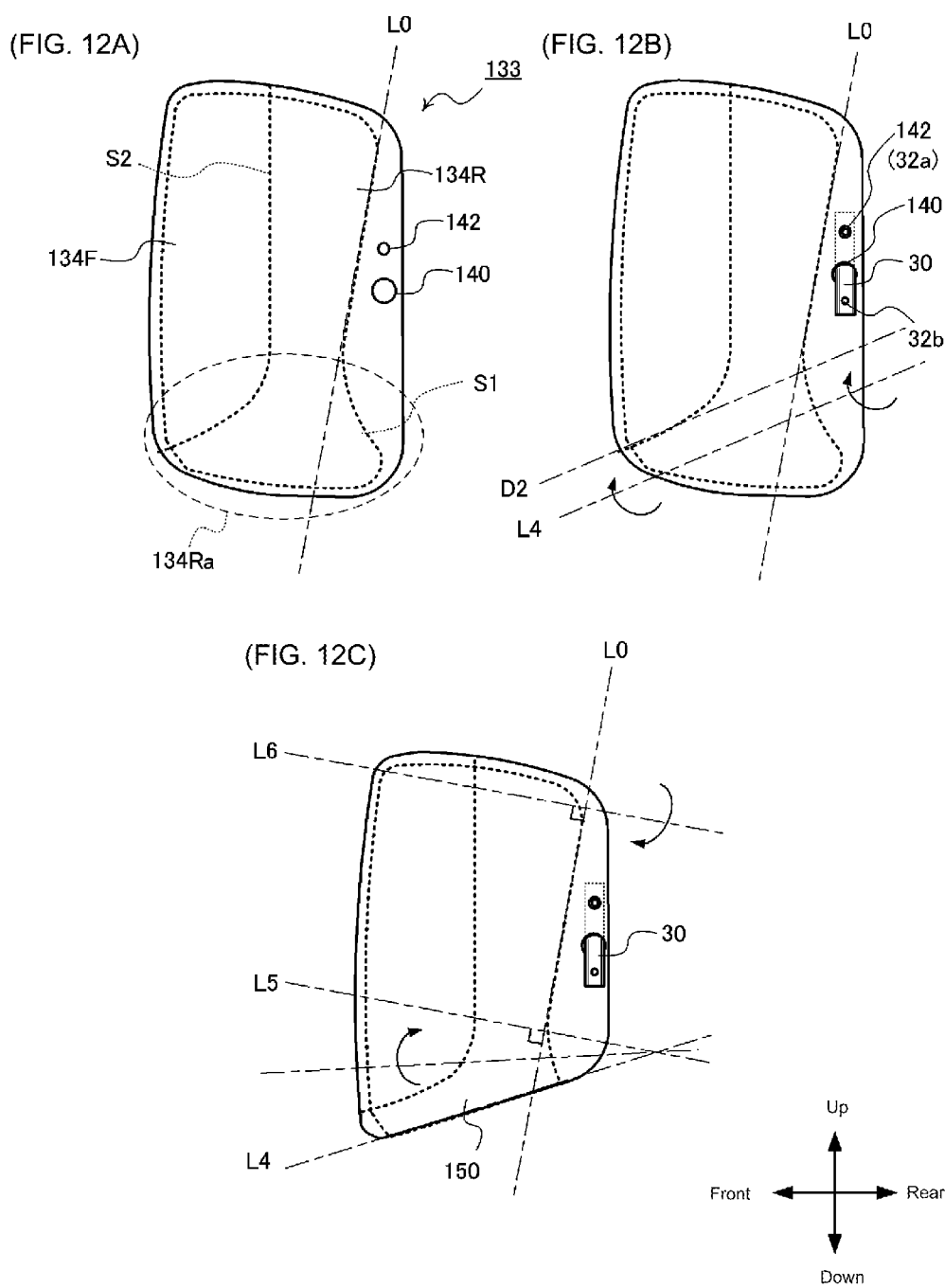

(FIG. 13A)
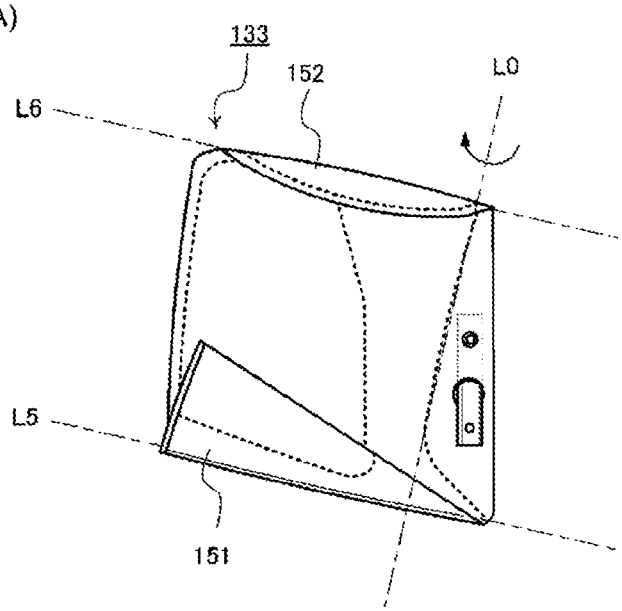
(FIG. 13B)
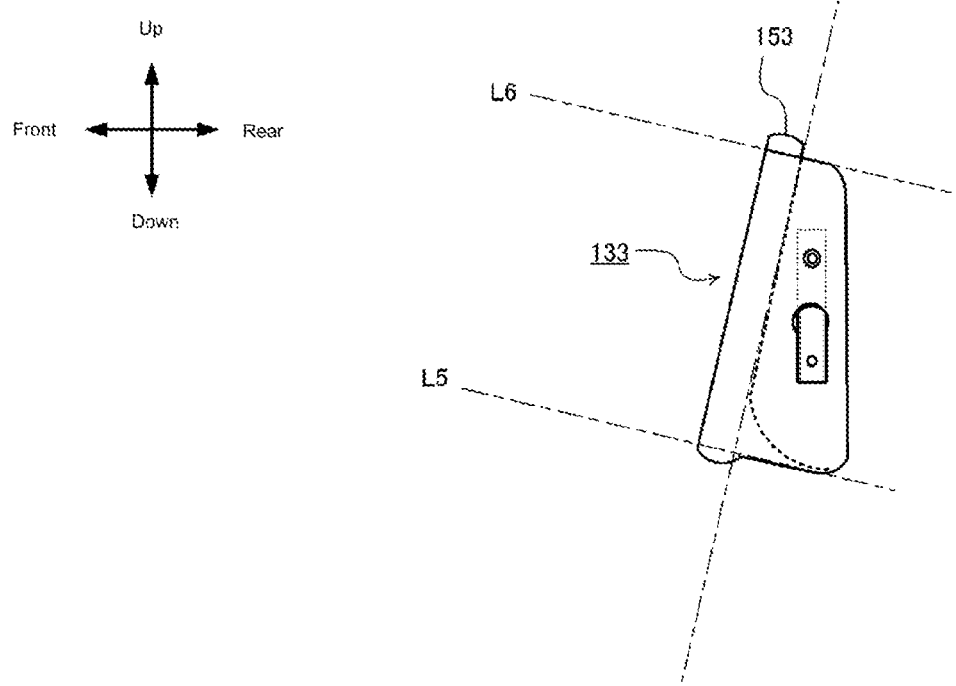

(FIG. 14A)
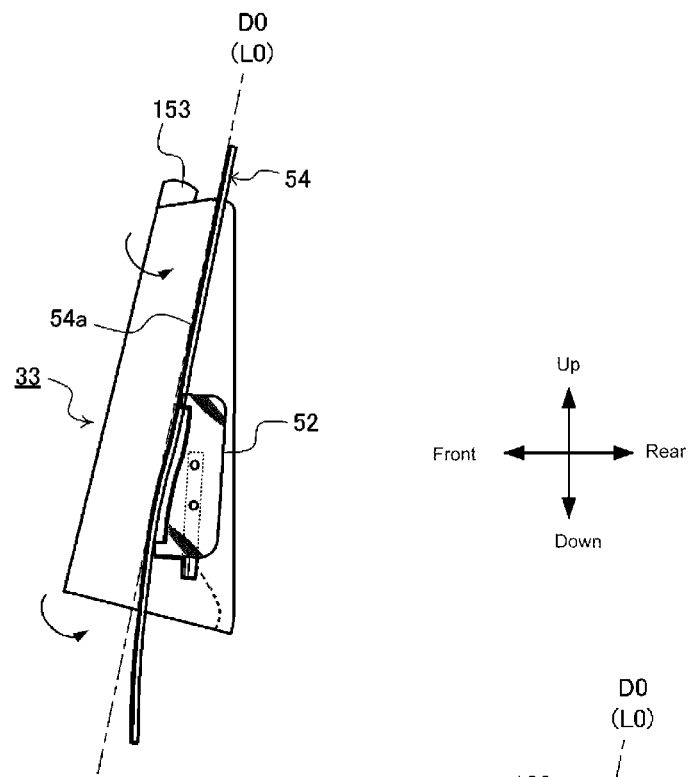
(FIG. 14B)
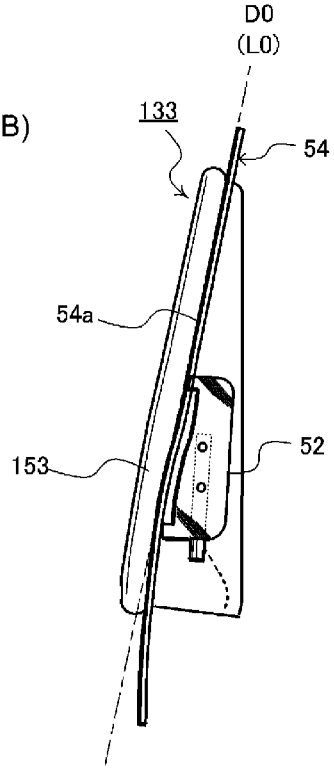

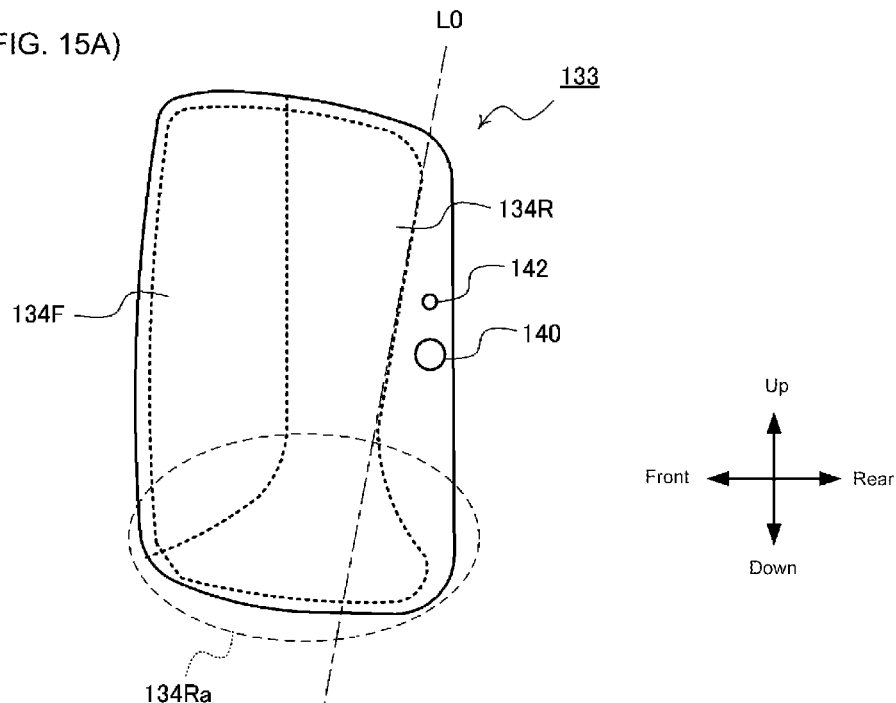
(FIG. 15A)
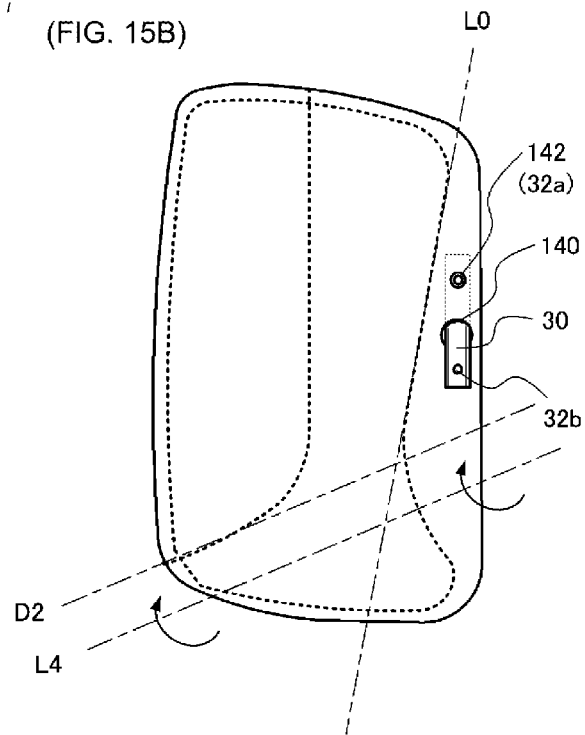
(FIG. 15B)

(FIG. 16A)
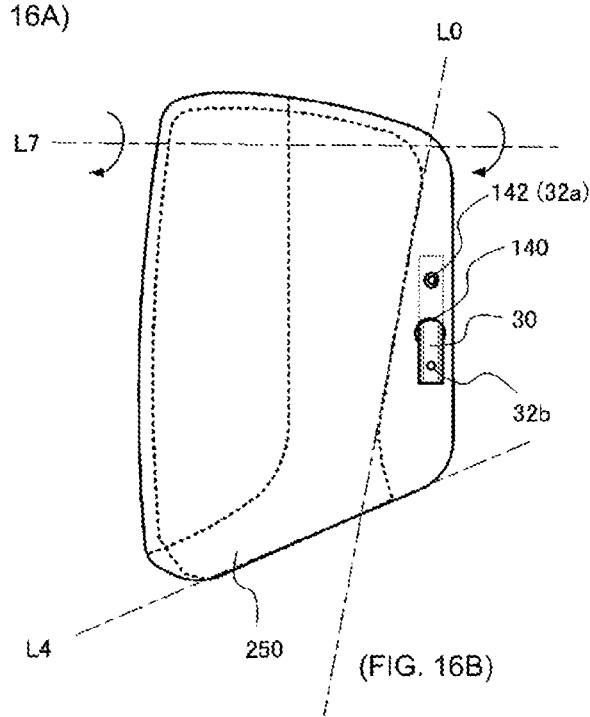
(FIG. 16B)
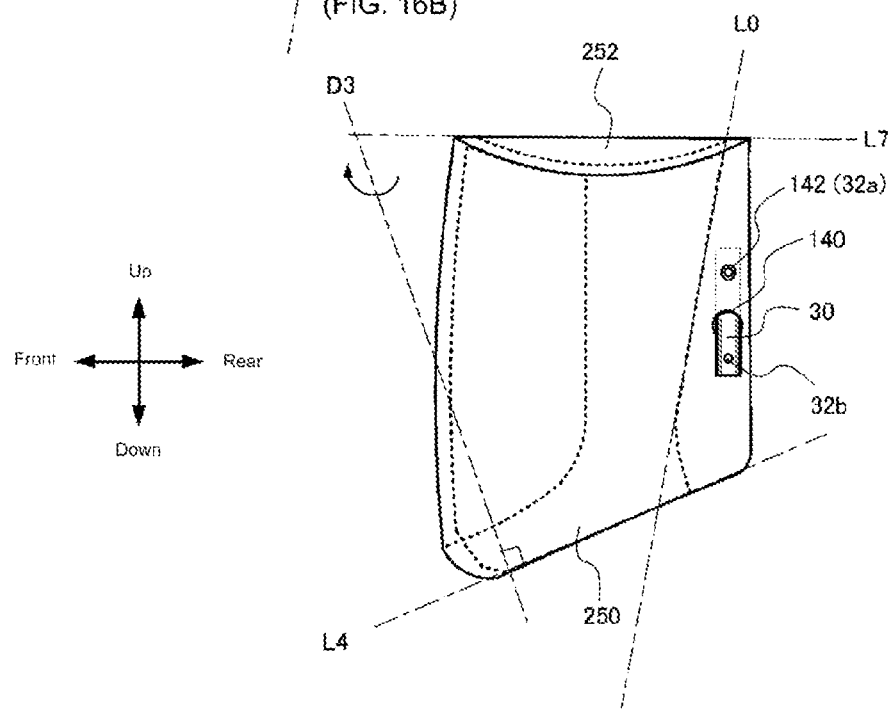

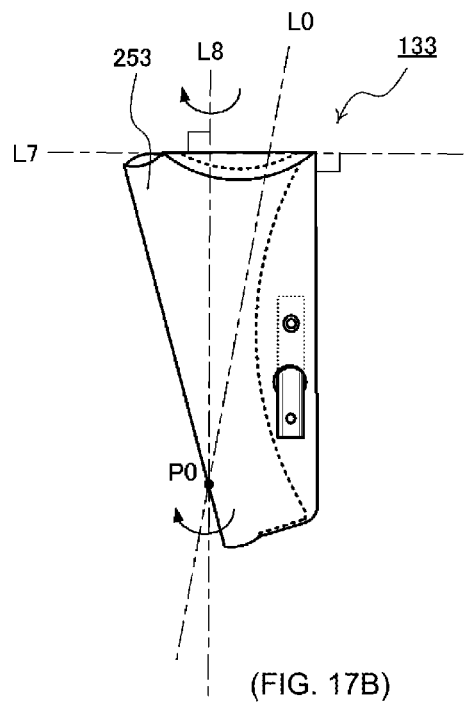
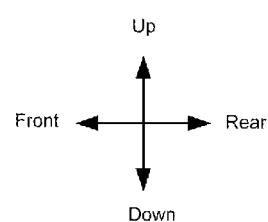
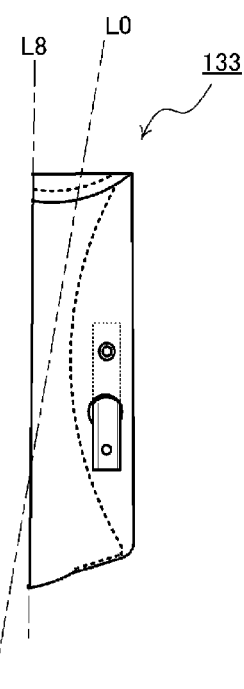

(FIG. 18A)
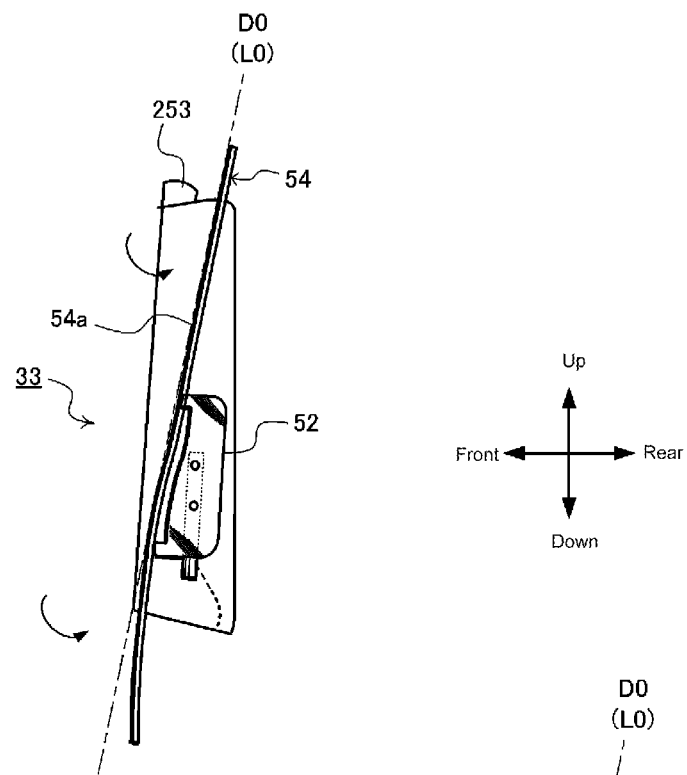
(FIG. 18B)
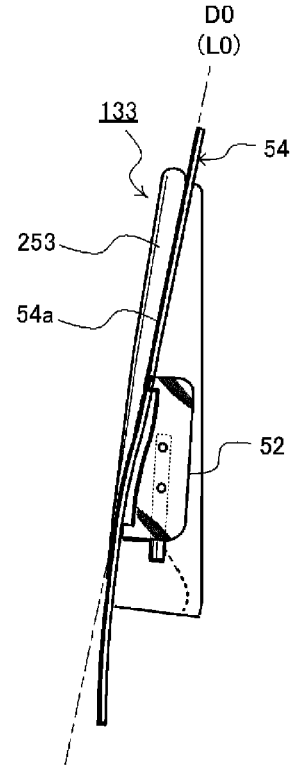

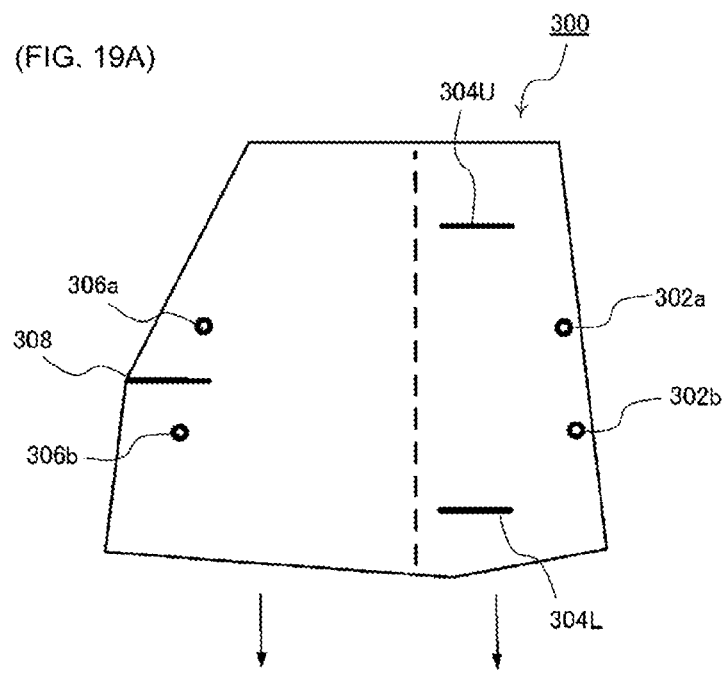
(FIG. 19A)
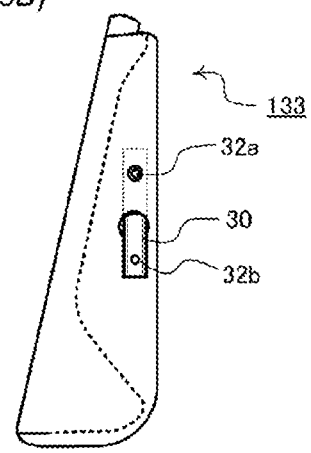
(FIG. 19B)

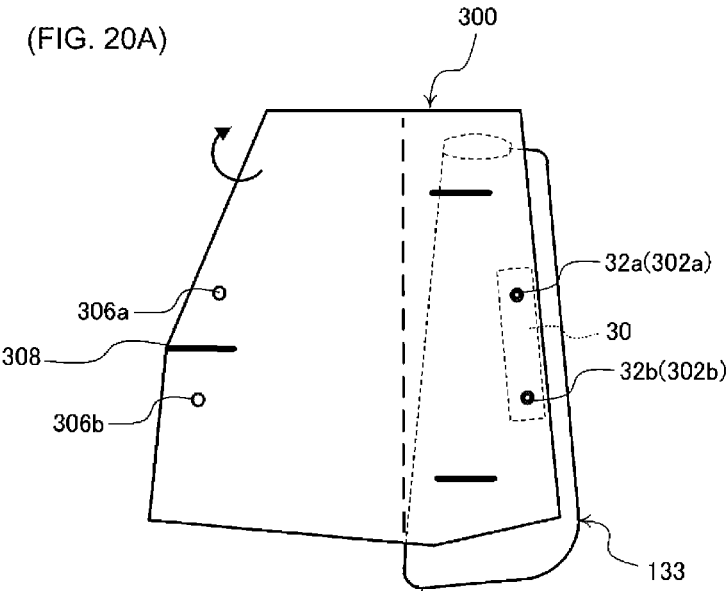
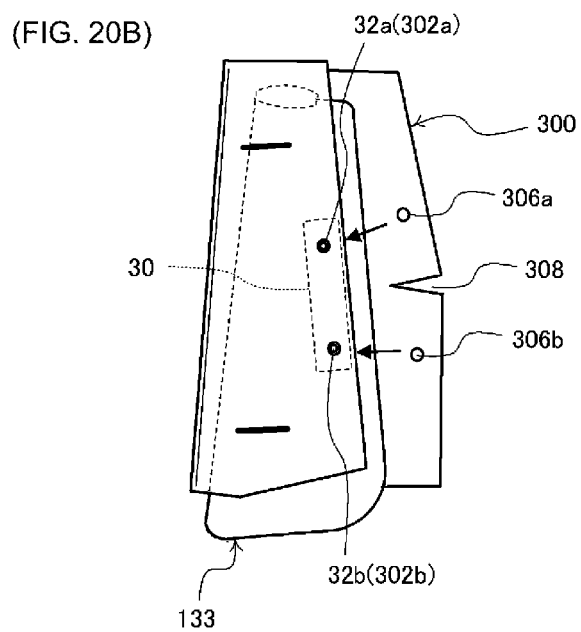

(FIG. 21A)
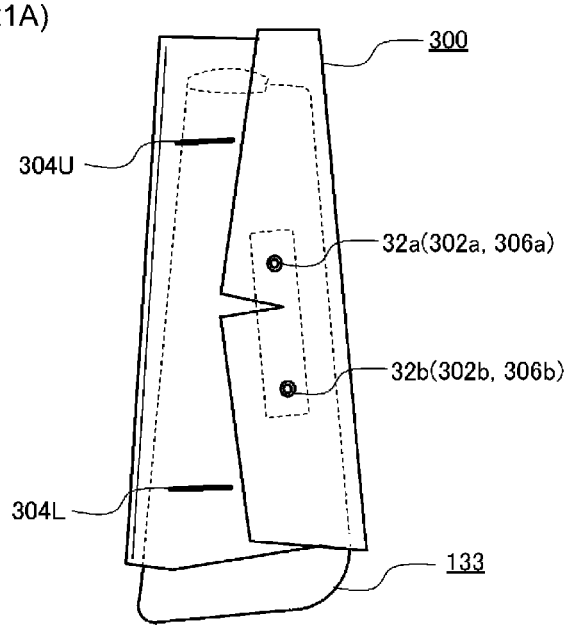
(FIG. 21B)
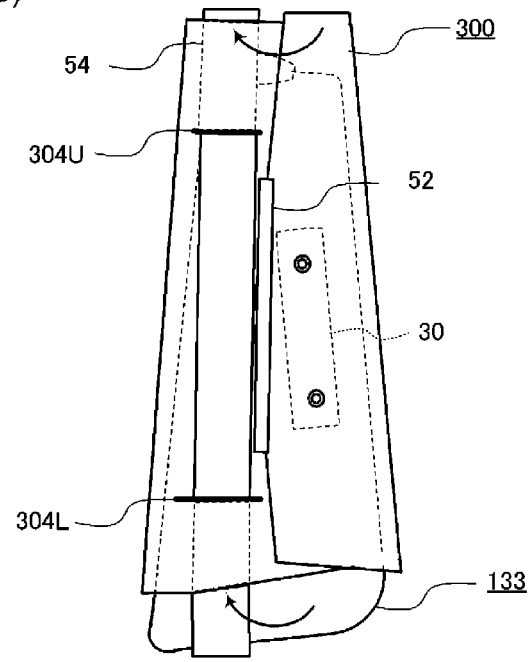

[FIG. 22]
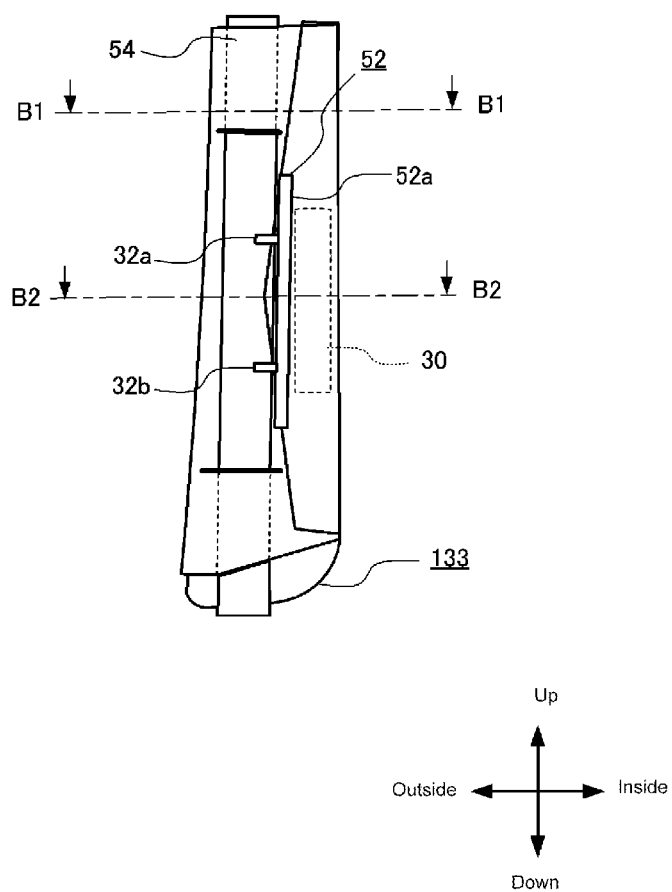

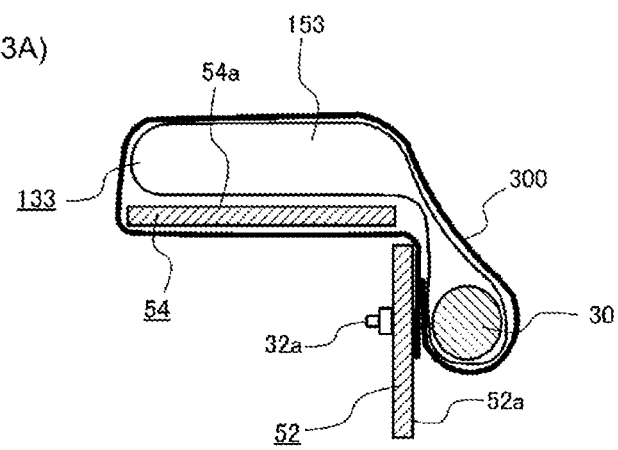
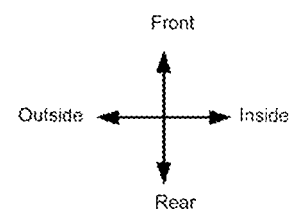
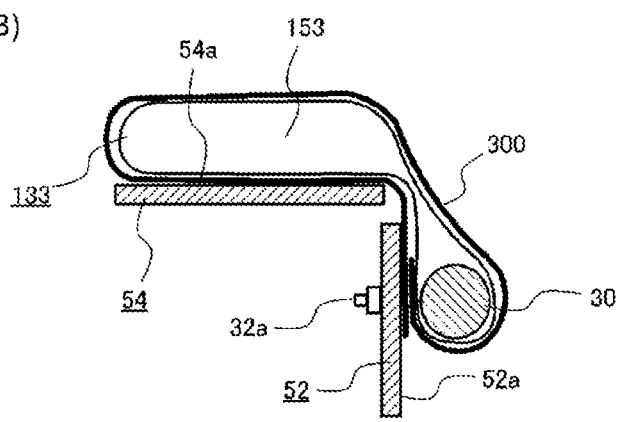

(FIG. 24A)
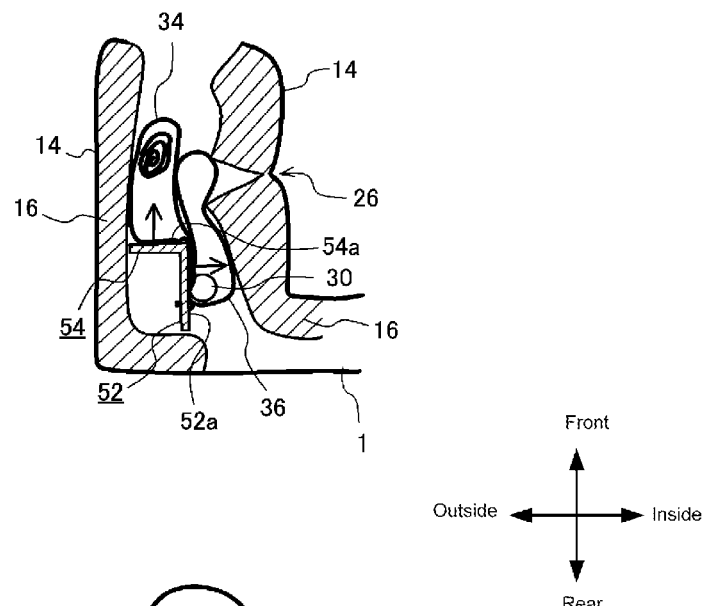
(FIG. 24B)
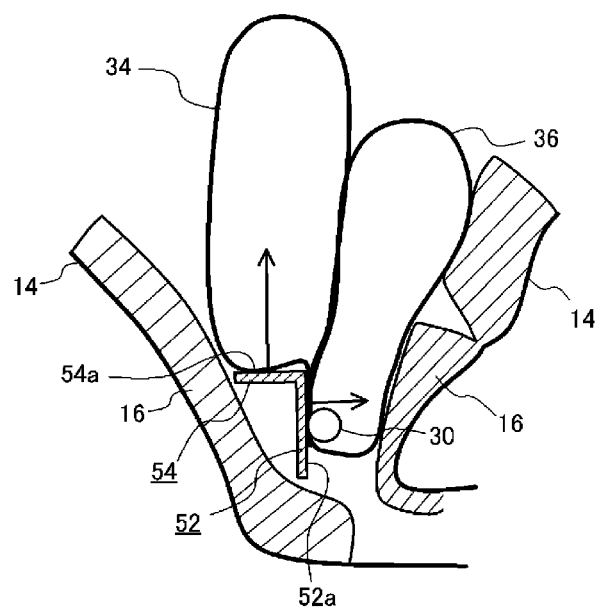

SIDE AIRBAG DEVICE, VEHICLE SEAT PROVIDED WITH SAME, AND METHOD FOR MANUFACTURING SIDE AIRBAG DEVICE

TECHNICAL FIELD

The present invention relates to a side airbag device equipped in a vehicle seat.

BACKGROUND

In order to protect passengers in the event of a vehicle collision, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of the automobile so as to protect passengers during collisions in a transverse direction of the vehicle, as well as when overturning and during rollover accidents; and a side airbag which is deployed between the passenger and a side panel so as to protect the passenger upon impact in the transverse direction of the vehicle. The present invention relates to a side airbag device and a vehicle seat provided with same.

The side airbag device described in Patent Document 1 below has a main airbag and an auxiliary airbag, and is configured to restrain an occupant as quickly as possible by expanding and deploying the auxiliary airbag prior to the main airbag. Note that there are other inventions apart from the invention described in Patent Document 1 of a side airbag device provided with an auxiliary airbag in addition to a main airbag.

Herein, the side airbag device is stowed in a side supporting part of a seat. Therefore, there are many restrictions on the shape and size, and thus the airbag device packaging must be compact. However, by making the airbag compact, a problem occurs where the deployment behavior of the airbag is adversely affected.

Also, ensuring that the airbag is deployed reliably and quickly is an important issue.

RELATED ART DOCUMENTS

Patent Documents

Patent Document 1: Japanese Unexamined Patent Application 2009-023494

SUMMARY OF THE INVENTION

Problem to be Solved by the Invention

In light of that described above, an object of the present invention is to provide: a side airbag device capable of properly and quickly deploying the airbag; and a vehicle seat provided therewith.

Another object of the present invention is to provide a method of manufacturing a side airbag device that contributes to reliable and rapid deployment of an airbag.

A further object of the present invention is to provide a side airbag device, a vehicle seat provided therewith, and a method for manufacturing the side airbag device, which contribute to compactness of the device.

Means for Solving the Problem

The present invention is a side airbag device that is stowed inside a vehicle seat and secured to a side frame, including an airbag that restrains an occupant by expanding and deploying, an inflator that supplies expansion gas to the airbag, and a bracket that holds the airbag and the inflator which is connected to the side frame. The airbag includes a pre-push chamber with the inflator stowed inside and deploys primarily on the occupant side (inner side) of the side frame, and a main chamber that is connected to the pre-push chamber and deploys primarily toward the front of the side frame. The bracket includes a first surface that faces the direction of travel of the vehicle (forward) and a second surface that faces the center side of the seat (inner side) in the width direction of the vehicle. In addition, at least the main chamber is arranged on top of the first surface of the bracket when the airbag is in a folded and/or rolled stowed state.

Here, "side frame" refers to a frame positioned inside the bulging portions (side support) on both the left and right sides of the frame that makes up the framework of the vehicle seat.

"Folding" includes both simply folding in the same direction, as well as folding into a bellows shape.

Furthermore, being arranged on the first "surface" is not meant to be placed "above" in a vertical relationship, and is meant to be placed against, in contact with, or facing the surface.

The main chamber of the airbag preferably deploys forward with the first surface of the bracket forward as a reaction force surface. This ensures that the main chamber is supported from the rear in the deployment direction and the airbag will be deployed reliably and quickly in the desired deployment direction (forward).

In a stowed state, the pre-push chamber of the airbag can be arranged on the second surface of the bracket. The pre-push chamber of the airbag is then preferably configured to deploy toward the occupant side with the second surface of the bracket as a reaction surface. As with the main chamber, the pre-push chamber is supported from behind in the deployment direction, which ensures that the airbag deploys in the desired deployment direction (inner side) quickly and reliably.

The main chamber can be partitioned into a forward chamber and a rear chamber. Furthermore, a reference line L0 can be set along the rear edge of the rear chamber when viewed from the side in the vehicle width direction. The rearward chamber can be configured such that at least one of the shoulder protecting region protecting the shoulder area and the waist protecting region protecting the waist area of the occupant seated in the seat reaches near the front end of the forward chamber. The reference line L0 is set, for example, to correspond to an inclination angle (D0) at the upper region of the first surface of the bracket when viewed from the side of the vehicle.

Here, the setting of the rear edge of the rear chamber along the reference line L0 is not limited to the case where the sewing that demarcates the rear edge coincides with the reference line L0 over the entire area, but also includes the case where the reference line L0 and the rear edge of the rear chamber coincide within a certain range. For example, the area where the reference line L0 and the rear edge of the rear chamber preferably overlap on at least 50% or more of the entire vertical area (height) of the airbag.

Note that a non-expanding region can be formed further behind the rear edge of the rear chamber. The bracket can include a plate-shaped first plate with a first surface and a plate-shaped second plate with a second surface. The inflator can then be secured to the second plate. In addition, the bracket can be arranged such that the first plate and second plate are generally orthogonal when viewed in a cross section perpendicular to the longitudinal direction.

Various aspects of airbag structures applied to the side airbag device of the present invention are explained below.

(First Aspect)

The rear chamber is configured such that the shoulder protecting region, which protects the shoulder area of the occupant seated in the seat, reaches near the front end part of the forward chamber. The shoulder protecting region of the airbag is tucked in or folded toward the center of the main chamber using a first line (L1) as a crease, which is orthogonal to the reference line (L0) and extends from near the front end part of the shoulder protecting region to near the rear end of the rear chamber. The airbag is folded or rolled from the front end side to the rear end side in the direction of the first line (L1). Then when the airbag is retained by the bracket, the reference line (L0) is arranged along the first surface of the first plate.

Here, "tucked in" refers to a state in which the edge of the airbag is pushed, folded, or inserted into the interior of said airbag.

The first aspect as described above can have a structure such that the folded or rolled lower end part of the airbag is further folded upwardly into a Z-shaped cross section with a second line (L2) and a third line (L3) that are parallel to the first line (L1) as creases.

(Second Aspect)

The rear chamber is configured such that the waist protecting region, which protects the waist area of the occupant seated in the seat, reaches near the front end part of the forward chamber. The lower end part of the waist protecting region of the airbag is tucked in or folded toward the center of the main chamber using a fourth line (L4) as a crease, which extends from near the front end part of the waist protecting region to near the rear end of the rear chamber. The tucked in or folded lower end part of the airbag is folded upwardly in a cross-sectional Z shape so that a fifth line (L5), which is orthogonal to the reference line (L0), becomes the fold of the bottom edge. The airbag is folded or rolled along the fifth line (L5) from the front end side to the rear end side. Then when the airbag is retained by the bracket, the reference line (L0) is arranged along the first surface of the first plate.

The second aspect as described above can have a structure such that the airbag is folded with the upper end part towards the center of the main chamber using a sixth line (L6) that is parallel to the fifth line (L5) as a crease, before being folded or rolled.

(Third Aspect)

The rear chamber is configured such that the waist protecting region, which protects the waist area of the occupant seated in the seat, reaches near the front end part of the forward chamber. The lower end part of the waist protecting region of the airbag is tucked in or folded toward the center of the main chamber using a fourth line (L4) as a crease, which extends from near the front end part of the waist protecting region to near the rear end of the rear chamber. The airbag is folded or rolled along the fourth line (L4) from the front end side to the rear end side. Then when the airbag is retained by the bracket, the reference line (L0) is arranged along the first surface of the first plate.

The third aspect as descried above can have a structure such that the upper end part of the airbag is folded towards the center of the main chamber using a seventh line (L7) that extends in the front-rear direction as a crease, before being folded or rolled.

In addition, when a point P0 is the point where the reference line (L0) and the front edge of the folded or rolled region intersect, a region forward of the reference line (L0) is folded rearward using an eighth line (L8), which passes through the point (P0) and is orthogonal to the seventh line (L7), as a foremost crease.

(Cover Member)

The side airbag device of the present invention can be further provided with a flexible cover member covering the folded airbag.

The cover member can have a first through-hole to be engaged with a stud bolt of the inflator and a second through-hole to be circled around the folded airbag and again engaged with said stud bolt.

The cover member preferably has slits that into which the upper and lower portions of the first plate are inserted, respectively. Thus, by providing a slit through which the first plate is inserted, when the airbag module is encircled by the cover member, unnecessary space formed between the cover member and the airbag and between the cover member and the bracket is reduced, thereby enabling the compressed airbag to be retained without loosening. This is particularly effective when the first plate and second plate are mutually orthogonal in a cross section perpendicular to the longitudinal direction of the bracket, as there is no wasted space formed by both plates.

(Manufacturing Method)

The manufacturing method of the side airbag device according to the present invention includes: a step of preparing an airbag that includes a pre-push chamber with the inflator stowed inside and deploys primarily on the occupant side (inner side) of the side frame, and a main chamber that is connected to the pre-push chamber and deploys primarily toward the front of the side frame; a step of preparing a bracket which, when connected to the side frame, has a first surface that faces toward the direction of travel of the vehicle (forward) and a second surface facing the center of the seat in the width direction of the vehicle; a step of folding and/or rolling the airbag into a stowed state; and a step of retaining the airbag with respect to the bracket such that at least the main chamber of the airbag in a stowed state is positioned on the first surface of the bracket.

In a stowed state, the pre-push chamber of the airbag can be arranged on the second surface of the bracket.

Here, the main chamber can be partitioned into a forward chamber and a rear chamber. Furthermore, a reference line L0 can be set along the rear edge of the rear chamber when viewed from the side in the vehicle width direction. The rearward chamber can be configured such that at least one of the shoulder protecting region protecting the shoulder area and the waist protecting region protecting the waist area of the occupant seated in the seat reaches near the front end of the forward chamber.

The bracket can include a plate-shaped first plate with a first surface and a plate-shaped second plate with a second surface. The inflator can then be secured to the second plate.

The following is an explanation of the manufacturing method of the side airbag device according to the present invention, as described above.

(First Aspect)

The shoulder protecting region of the rear chamber, which protects the shoulder area of the occupant seated in the seat, reaches near the front end part of the forward chamber. The manufacturing method further includes: a step where the shoulder protecting region of the airbag is tucked in or folded toward the center of the main chamber using a first line (L1) as a crease, which is orthogonal to the reference line (L0) and extends from near the front end part of the shoulder protecting region to near the rear end of the rear chamber; a step where the airbag is folded from the front edge towards the rear edge in a direction nearly orthogonal to the first line (L1) as a longitudinal direction; and a step where the airbag is retained on the bracket such that the reference line (L0) is positioned along the first surface of the first plate.

A step where the folded or rolled lower end part of the airbag is further folded upwardly into a Z-shaped cross section with a second line (L2) and a third line (L3) that are parallel to the first line (L1) as creases can be further included.

(Second Aspect)

The waist protecting region of the rear chamber, which protects the waist area of the occupant seated in the seat, reaches near the front end part of the forward chamber. The manufacturing method further includes: a step where the lower end part of the waist protecting region of the airbag are tucked in or folded toward the center of the main chamber using a fourth line (L4) as a crease, which extends from near the front end part of the waist and shoulder protecting regions to near the rear end of the rear chamber; a step where the tucked in or folded lower end part of the airbag is folded upwardly into a Z-shaped cross section so that a fifth line (L5), which is orthogonal to the reference line (L0), becomes the fold of the bottom edge; a step where the airbag is folded or rolled from the front edge towards the rear edge in a direction orthogonal to the fifth line (L5) as a longitudinal direction; and a step where the airbag is retained on the bracket such that the reference line (L0) is positioned along the first surface of the first plate.

Before folding or rolling the airbag, the upper end part can be folded towards the center of the main chamber using a sixth line (L6), which is parallel to the fifth line (L5), as a crease.

(Third Aspect)

The waist protecting region of the rear chamber, which protects the waist area of the occupant seated in the seat, reaches near the front end part of the forward chamber. The manufacturing method further includes: a step where the lower end part of the waist protecting region of the airbag is tucked in or folded toward the center of the main chamber using a fourth line (L4) as a crease, which extends from near the front end part of the waist protecting region to near the rear end of the rear chamber; a step where the airbag is folded or rolled along the fourth line (L4) from the front end side to the rear end side; and a step where the airbag is retained by the bracket such that the reference line (L0) is positioned along the first surface of the first plate.

A step can be further included where before folding or rolling, the upper end part of the airbag is folded towards the center of the main chamber using a seventh line (L7), which extends in the front-rear direction, as a crease.

In addition, when a point P0 is the point where the reference line (L0) and the front edge of the folded or rolled region intersect, a region forward of the reference line (L0) is folded rearward using an eighth line (L8), which passes through the point (P0) and is orthogonal to the seventh line (L7), as a foremost crease.

(Envelopment by Cover Members)

Regarding the manufacturing method according to the present invention as described above, the following step using a cover member can be added.

In other words, a step can be further included where the folded airbag is covered by a flexible cover member.

Here, the manufacturing method can further include: a step where a first through-hole of the cover member engages with a stud bolt of the inflator; and a step where a second through-hole circles around the folded airbag and engages with said stud bolt.

A step can be further included where the upper and lower portions of the first plate are inserted into the pair of slits formed on the upper and lower portions of the cover member, respectively.

In the specification and claims of the present application, the direction in which the occupant is facing (the direction of vehicle travel) when the occupant is seated in the seat in a normal posture is referred to as "forward" and the opposite direction is referred to as "rear", and the axis of the coordinate is referred to as the "front-rear direction". Moreover, when the passenger is seated in the seat in a regular posture, the right of the passenger is referred to as the "right direction," the left of the passenger is referred to as the "left direction," and the direction indicating the coordinate axis is referred to as the "left and right direction." In the left-right direction, a region on an occupant side from a side frame of the seat shall be referred to as "inside", and a region opposite from the occupant as viewed from the side frame shall be referred to as "outside". Similarly, when the passenger is seated in the seat in a regular posture, the head direction of the passenger is referred to as "up," the waist direction of the passenger is referred to as "down," and the direction indicating the coordinate axis is referred to as the "vertical direction."

The side airbag apparatus according to the present invention includes a type which is deployed on the door side of (outside) the seat, along with a type which is deployed on the vehicle center side of the seat. A side airbag device of a type which is deployed on the vehicle center side of the seat, for example, is referred to as a far side airbag, front center airbag, rear center airbag, and the like.

BRIEF DESCRIPTION OF THE DRAWINGS

FIG. 1 is a perspective view primarily illustrating an external shape of a vehicle seat according to the present invention, with an illustration of a side airbag device omitted.

FIG. 2 is a perspective view illustrating an internal structure (seat frame) functioning as a framework of the vehicle seat illustrated in FIG. 1, with an illustration of the side airbag device omitted.

FIG. 3 is a schematic side surface view of the vehicle seat according to the present invention, illustrating a condition where the side airbag device is stored therein, observed from the outside in the vehicle width direction.

FIG. 4 is a cross sectional view illustrating the structure of the vehicle seat according to the present invention, corresponding to part of a cross section in an A1-A1 direction of FIG. 3.

FIG. 5 is a schematic side surface view of the vehicle seat according to the present invention, illustrating a condition where the airbag is deployed as observed from the outside in the vehicle width direction.

FIG. 6 is a cross-sectional view illustrating the structure of the side airbag device according to the present invention, corresponding to part of the cross section in the A2-A2 direction of FIG. 5.

FIG. 7 is a rear view (A) and a side view (B) of the structure of the bracket employed in the airbag device according to the present invention. Note that the rear view (A) illustrates a view observed from the rear of the vehicle, and the side view (B) illustrates a view observed from the outer side of the vehicle seat (opposite side of the occupant).

FIGS. 8(A) and 8(B) are plan views (side views) illustrating the structure of the airbag employed in the side airbag device of embodiment 1 of the present invention.

FIGS. 9(A) and 9(B) are plan views (side views) illustrating the steps in folding the airbag employed in the side airbag device of the first embodiment of the present invention.

FIGS. 10(A) and 10(B) are plan views (side views) illustrating the steps in folding the airbag employed in the side airbag device of the embodiment 1 of the present invention.

FIGS. 11(A) and 11(B) are plan views (side views) illustrating the steps in attaching the bracket to the airbag according to embodiment 1 of the present invention.

FIGS. 12(A), 12(B), and 12(C) are plan views (side views) illustrating the steps in folding the airbag employed in the side airbag device according to embodiment 2 of the present invention.

FIGS. 13(A) and 13(B) are plan views (side views) illustrating the steps in folding the airbag employed in the side airbag device of the embodiment 2 of the present invention.

FIGS. 14(A) and 14(B) are plan views (side views) illustrating the steps in attaching the bracket to the airbag according to the embodiment 2 of the present invention.

FIGS. 15(A) and 15(B) are plan views (side views) illustrating the steps in folding the airbag employed in the side airbag device of the embodiment 3 of the present invention.

FIGS. 16(A) and 16(B) are plan views (side views) illustrating the steps in folding the airbag employed in the side airbag device of the embodiment 3 of the present invention.

FIGS. 17(A) and 17(B) are plan views (side views) illustrating the steps in folding the airbag employed in the side airbag device of the embodiment 3 of the present invention.

FIGS. 18(A) and 18(B) are plan views (side views) illustrating the steps in attaching the bracket to the airbag according to the embodiment 3 of the present invention.

FIG. 19 is a plan view (A) of a structure of a soft cover that can be employed in the side airbag device according to the present invention, and an airbag (B) in a stowed state (compressed state).

FIGS. 20(A) and 20(B) are explanatory diagrams illustrating the steps of encircling the airbag with the soft cover according to the present invention.

FIGS. 21(A) and 21(B) are explanatory diagrams illustrating the steps of encircling the airbag with the soft cover according to the present invention.

FIG. 22 is an explanatory diagram illustrating the state in which the airbag is enclosed by the soft cover according to the present invention.

FIG. 23 is a cross-sectional view (A) in the B1-B1 direction of FIG. 22, and a cross-sectional view (B) in the B2-B2 direction of FIG. 22.

FIGS. 24(A) and 24(B) are cross-sectional views illustrating the airbag according to the present invention in a deployed state.

DESCRIPTION OF THE PREFERRED EMBODIMENT

The vehicle seat with the side airbag device according to the embodiments of the present invention mounted thereon will be described with reference to the accompanying drawings.

FIG. 1 is a perspective view primarily illustrating an external shape of a vehicle seat used as the vehicle seat according to the present invention, with an illustration of an airbag device (airbag module) 20 omitted. FIG. 2 is a perspective view illustrating an internal structure (seat frame) functioning as a framework of the vehicle seat illustrated in FIG. 1, with an illustration of the airbag device (airbag module) 20 omitted herein as well. FIG. 3 is a schematic side surface view of the vehicle seat according to the present invention, illustrating a condition where the airbag device (airbag module) 20 is stowed on a side surface (near side) near a left side seat door as observed from the outside in the vehicle width direction.

As illustrated in FIGS. 1 and 2, seen as the location, the vehicle seat according to the present example is configured by: a seat cushion 2 of a part on which an occupant is seated; a seat back 1 forming a backrest; and a headrest 3 connected to the upper end of the seat back 1.

As illustrated in FIG. 2, a seat back frame 1f forming a skeleton of the seat is provided inside the seat back 1, a pad 16 (refer to FIG. 4) made of a urethane foam material or the like is provided on a surface and periphery thereof, and a surface of the pad 16 is covered with a skin 14 such as leather, fabric, or the like. A seating frame 2f is provided on a bottom side of the seat cushion 2. Similar to the seat back 1, a pad made of a urethane foam material or the like is provided on an upper surface and periphery thereof, and a surface of the pad is covered by the skin 14 (FIG. 4) such as leather, fabric, or the like. The seating frame 2f and the seat back frame 1f are connected via a reclining mechanism 4.

As illustrated in FIG. 2, the seat back frame 1f is configured in a frame shape by: a side frame 10 arranged so as to be separated into the left and right and extending in a vertical direction; an upper frame connected to an upper end part of the side frame 10; and a lower frame connected to a lower end part thereof. A cushion member is provided outside a headrest frame to configure the headrest 3.

FIG. 4 is a cross sectional view illustrating the structure of the vehicle seat according to the present invention, corresponding to a part of a cross section in an A1-A1 direction of FIG. 3. The side frame 10 can be molded of resin or metal and, as illustrated in FIG. 4, can be formed into an L-shaped cross sectional shape or a U-shaped cross sectional shape. An airbag module (side airbag device) 20 is secured to the inside (seat center side) and front side of the side frame 10.

As illustrated in FIG. 4, the seat back 1 includes a side supporting part 12 which swells in the vehicle traveling direction (vehicle front) on a vehicle width direction side part (end part). A urethane pad 16 is arranged inside the side supporting part 12, and the side airbag device 20 is stored in a gap of the urethane pad 16. The side airbag device 20 includes: an airbag 33 that restrains an occupant when expanded and deployed; and an inflator 30 that supplies an expansion gas to the airbag 33.

Seams 18, 22, 24 of the skin 14 of the seat back 1 are interwoven and connected by sewing. Note that the front seam 18 is cleft when the airbag is deployed.

Furthermore, a start region 26 is formed in the side supporting part 12 as a starting point when the side supporting part 12 bends towards the occupant side due to the expansion of a second chamber 36 (refer to FIG. 24). The start region 26 can be any one of a notch, recess, or thin region, or combinations thereof. The start region 26 may be formed at only a urethane 16 part inside the side supporting part 12. Furthermore, the start region 26 can be omitted.

The compressed airbag 33 is secured to the side frame 10 via the brackets 52 and 54. Details of the brackets 52 and 54 are described below.

The airbag 33 may be covered by a soft cover made of fabric (see FIG. 20 to FIG. 23). The airbag 33 can appropriately use an appropriate compressing method other than folding into a bellows shape, or rolling ("folding" includes rolling). Details are described below. Note that in FIG. 4, reference code 25 indicates a door trim.

FIG. 5 is a schematic side view of the vehicle seat according to the present invention, illustrating a condition where the airbag is deployed as observed from the outside in the vehicle width direction. As illustrated in FIG. 5, the airbag 33 is provided with a main chamber 34 that deploys toward the front of the side support part 12 and a pre-push chamber 36 that deploys to the inside of the main chamber 34 in the width direction of the vehicle.

FIG. 6 is a schematic diagram of the structure of the side airbag device according to the present invention, illustrating the deployed state of the airbag 33 corresponding to the cross section in the A2-A2 direction of FIG. 5.

As described above, the airbag 33 comprises the main chamber 34 that deploys toward the front of the side support part 12 of the seat, and the pre-push chamber 36 that houses the inflator 30 and begins to deploy prior to the main chamber 34 to the inside of the main chamber 34 in the vehicle width direction.

An internal vent hole (not shown) is provided in the partitioning part (boundary portion) between the main chamber 34 and the pre-push chamber 36, through which expansion gas flows from the pre-push chamber 36 to the main chamber 34.

An exhaust vent V (not shown) is formed on the front end part of the main chamber 34 for exhausting the gas to the outside. Note that at least one exhaust vent for exhausting the gas to the outside can be formed on a front end part of the pre-push chamber 36, similar to the main chamber 34.

The main chamber 34 is partitioned into a forward chamber 34F and a rear chamber 34R by a partition panel 134c. An internal vent V34d is formed in the partition panel 134c for the expansion gas to flow from the rear chamber 34R to the forward chamber 34F.

FIG. 7 is a rear view (A) and a side view (B) of the structure of the brackets 52 and 54 employed in the airbag device according to the present invention. Note that the rear view (A) illustrates a view observed from the rear of the vehicle, and the side view (B) illustrates a view observed from the outer side of the vehicle seat (opposite side of the occupant). In FIG. 7, for the purpose of clarifying the shape and arrangement of the brackets 52 and 54, the airbag 33 is omitted and only the inflator 30 is shown.

The brackets (52, 54) are provided with a first plate 54 extending in a vertical direction and a second plate 52 through which two stud bolts 32a, 32b that are connected to the inflator 30 are inserted through, such that the second plate 52 is directly secured to the side frame 10. These types of brackets are generally arranged such that the first plate 54 and second plate 52 are orthogonal when viewed in a cross section perpendicular to the longitudinal direction (see FIG. 4 and FIG. 6), and the first plate 54 and the second plate 52 are connected to each other by welding or the like.

The first plate 54 of the bracket has a first surface 54a that faces the vehicle traveling direction, and a main fold portion (main chamber 34) of the airbag 33 in a stowed state is arranged along the first surface 54a. At this time, when the long and thin compressed airbag 33 expands and deploys in the vehicle traveling direction, the first surface 54a of the first plate 54 is a reaction force surface, and thus the airbag 33 reliably and quickly deploys in a forward direction.

On the other hand, the second plate 52 of the bracket has a second surface 52a facing the occupant side, and mainly the pre-push chamber 36 of the airbag 33 is arranged on said second surface 52a. When the pre-push chamber 36 is deployed, the second surface 52a of the second plate 52 becomes a reaction force surface, causing the pre-push chamber 36 to deploy reliably and quickly in the direction of the occupant (inner side).

In FIG. 7(B), the reference sign "DO" indicates a direction in which a majority of the upper portion of the first plate 54 extends. In addition, as will be explained in detail later, the airbag 33 is arranged and stowed so that the reference line L0 (such as in FIG. 5) set on the airbag 33 coincides with this direction DO. Furthermore, the line HO in FIG. 4 and FIG. 6 corresponds to the reference line L0 when observed from the vertical direction.

Example 1

FIGS. 8(A) and 8(B) are plan views (side views) illustrating the structure of the airbag 33 employed in the side airbag device of embodiment 1 of the present invention when viewed from the occupant side. As can be more readily understood in conjunction with FIG. 6, the airbag 33 has a pre-push chamber 36 where the inflator 30 is stowed inside and deploys primarily on the occupant side (inner side) of the side frame 10, and a main chamber 34 that is connected to the pre-push chamber 36 and deploys primarily toward the front of the side frame 10. Each chamber 34 (34F, 34R) and 36 are compartmentally formed by stitches S1, S2, S3.

As described previously, the main chamber 34 is partitioned into a forward chamber 34F and a rear chamber 34R. Furthermore, the reference line L0 is set along the rear edge of the rear chamber 34R when viewed from the side in the vehicle width direction. Note, a non-expanding region is formed further behind the rear edge (L0) of the rear chamber 34R. The non-expanding region has an opening 40 into which the inflator 30 is inserted and an opening 42 through which the upper stud bolt 32a of the inflator 30 passes.

The rear chamber 34R of the main chamber 34 is configured such that the shoulder protecting region 34Ra protecting the shoulder area of the occupant seated in the seat reaches near the front end part of the forward chamber 34F.

FIGS. 9(A), 9(B), 10(A), and 10(B) are plan views (side views) illustrating the steps in folding the airbag 33 employed in the side airbag device according to embodiment 1 of the present invention. FIGS. 11(A) and (B) are plan views (side views) illustrating the steps in which the brackets (52, 54) are attached to the airbag 33 according to embodiment 1 of the present invention.

When folding the airbag 33, first, as shown in FIGS. 9(A) and 9(B), insert the inflator 30 through the opening 40 and set said inflator 30 so that at least the gas discharge hole (not shown) is fully positioned inside the pre-push chamber 36. Next, the shoulder protecting region 34Ra is tucked in or folded toward the center of the main chamber 34 using the first line L1 as a crease, which is orthogonal to the reference line (L0) and extends from near the front edge of the shoulder protecting region 34Ra to near the rear edge of the rear chamber 34R.

Next, as illustrated in FIG. 9(B) and FIG. 10(A), the airbag 33 is folded or rolled from the front end side toward the rear end side along the direction of the first line L1, to form rolled part 53. Then, the lower end of the airbag 33 is further folded upwardly into a Z-shaped cross section using the second line L2 and the third line L3 as creases, which are substantially parallel to the first line L1, to form a Z-fold portion 55 (FIG. 10(B)).

Next, as illustrated in FIG. 11(A), the brackets 52, 54 are attached with respect to the compressed airbag 33. Specifically, the stud bolts 32a, 32b of the inflator 30 are inserted into the second plate 52. Thereafter, the airbag is folded so that the reference line L0 on the airbag 33 side contacts the first surface 54a of the first plate 54 (FIG. 11(B)).

Embodiment 2

FIGS. 12(A), 12(B), 12(C), and FIGS. 13(A), 13(B) are plan views (side views) illustrating the steps in folding the airbag 133 employed in the side airbag device according to embodiment 2 of the present invention. FIGS. 14(A), 14(B) are plan views (side views) illustrating the steps in which the brackets 52, 54 are attached to the airbag 133 according to embodiment 2 of the present invention.

The airbag 133 according to embodiment 2 has a pre-push chamber (not shown) that stows the inflator 30 inside and deploys primarily on the occupant side (inner side) of the side frame 10, and a main chamber 134 that is connected to the pre-push chamber 36 and deploys primarily toward the front of the side frame 10. Each chamber 134 (134F, 314R) are compartmentally formed by stitches S1, S2. The configuration of the pre-push chamber is the same as that of the pre-push chamber 36 of embodiment 1 described above, and a duplicate description is omitted.

Similar to embodiment 1, the main chamber 134 is partitioned into a forward chamber 134F and a rear chamber 134R. Furthermore, the reference line L0 is set along the rear edge of the rear chamber 134R when viewed from the side in the vehicle width direction. A non-expanding region is formed further behind the rear edge L0 of the rear chamber 134R. The non-expanding region has an opening 40 into which the inflator 30 is inserted and an opening 42 through which the upper stud bolt 32a of the inflator 30 passes.

The rear chamber 134R of the main chamber 134 is formed such that the waist protecting region 34Ra protecting the waist area of the occupant seated in the seat reaches near the front end of the forward chamber 134F.

When folding the airbag 133, the inflator 30 is first inserted through the opening 40 and set inside the pre-push chamber as illustrated in FIG. 12(B). Next, a lower end part 150 is formed by tucking in or folding the lower end part of the waist protecting region 134Ra toward the center of the main chamber 134, using the fourth line L4 as a crease, which extends from near the front end of the waist protecting region 134Ra to near the rear end of the rear chamber 134R (FIG. 12(C)). Note that the fourth line L4 of the main chamber 134 is substantially parallel to the line D2 extending in the front-rear direction of the stitch line S2 that serves as a partition between the forward chamber 134F and the rear chamber 134R.

Next, as illustrated in FIG. 12(C), the lower end part 150 of the airbag 133 is folded upwardly into a Z-shaped cross section so that the fifth line L5, which is orthogonal to the reference line L0, becomes a fold of the lower edge, thereby forming a Z-fold 151 (FIG. 13(A)). In this case, the airbag may be simply folded back (upwards) towards the center of the main chamber so that the fifth line L5 becomes the fold of the lower edge. Using the sixth line L6 parallel to the fifth line L5 as a crease, the upper end of the airbag 133 is folded (folded back) toward the center of the main chamber 134.

The airbag 133 is then folded or rolled along the fifth line L5 (sixth line L6) (in a perpendicular direction) from the front end side to the rear end side to form a rolled part 153 (FIG. 13(B)).

Next, as illustrated in FIG. 14(A), the brackets 52, 54 are attached with respect to the compressed airbag 133. Specifically, the stud bolts 32a, 32b of the inflator 30 are inserted into the second plate 52. Thereafter, the airbag is folded so that the reference line L0 on the airbag 133 side contacts the first surface 54a of the first plate 54 (FIG. 14(B)).

Embodiment 3

FIGS. 15(A), 15(B), and 16(A), 16(B), and 17(A), 17(B) are plan views (side views) illustrating the steps in folding the airbag 133 employed for the side airbag device according to embodiment 3 of the present invention. FIGS. 18(A), 18(B) are plan views (side views) illustrating the steps in which the brackets 52, 54 are attached to the airbag 133 according to embodiment 3 of the present invention. The airbag 133 used in embodiment 3 is structurally identical to the airbag 133 used in embodiment 2.

The airbag 133 according to embodiment 3 has a pre-push chamber (not shown) that stows the inflator 30 inside and deploys primarily on the occupant side (inner side) of the side frame 10, and a main chamber 134 that is connected to the pre-push chamber 36 and deploys primarily toward the front of the side frame 10. Each chamber 134 (134F, 314R) are compartmentally formed by stitches S1, S2.

Similar to embodiment 1 and embodiment 2, the main chamber 134 is partitioned into a forward chamber 134F and a rear chamber 134R.

Furthermore, the reference line L0 is set along the rear edge of the rear chamber 134R when viewed from the side in the vehicle width direction. A non-expanding region is formed further behind the rear edge L0 of the rear chamber 134R. The non-expanding region has an opening 40 into which the inflator 30 is inserted and an opening 42 through which the upper stud bolt 32a of the inflator 30 passes.

The rear chamber 134R of the main chamber 134 is formed such that the waist protecting region 34Ra protecting the waist area of the occupant seated in the seat reaches near the front end of the forward chamber 134F.

When folding the airbag 133, the inflator 30 is first inserted through the opening 40 and set inside the pre-push chamber as illustrated in FIG. 15(B). Next, a lower end part 250 is formed by tucking in or folding the lower end part of the waist protecting region 134Ra toward the center of the main chamber 134, using the fourth line L4 as a crease, which extends from near the front end of the waist protecting region 134Ra to near the rear end of the rear chamber 134R (FIG. 16(A)). Note that the fourth line L4 of the main chamber 134 is substantially parallel to the line D2 extending in the front-rear direction of the stitch line S2 that serves as a partition between the forward chamber 134F and the rear chamber 134R.

Next, as illustrated in FIG. 16(B), the upper end part of the airbag 133 is folded (folded back) toward the center of the main chamber 134 using the seventh line L7 extending in the front-back direction as a crease to form a folded part 252.

Next, the airbag 133 is folded or rolled from the front end side to the rear end side along the fourth line L4 to form a rolled part 253 (FIG. 17(A)). Then, as shown in FIG. 17(B), the region forward of the reference line L0 is folded toward the rear so that the eighth line L8 orthogonal to the seventh line L7 passing through the point P0 where the reference line L0 and the front edge of the rolled part 253 intersect becomes the foremost fold. In this case, a Z-fold part may be formed by folding the region forward of the reference line L0 in a Z-shaped cross section so that the eighth line L8 becomes the foremost fold.

Next, as illustrated in FIG. 18(A), the brackets 52, 54 are attached relative to the compressed airbag 133. Specifically, the stud bolts 32a, 32b of the inflator 30 are inserted into the second plate 52. Thereafter, the airbag is folded so that the reference line L0 on the airbag 133 side touches the first surface 54a of the first plate 54 (FIG. 18(B)).

(Cover Member)

The configuration of a cover member (soft cover) 300 that surrounds the airbag module configured as described above will be described below, taking the airbag 133 of embodiment 2 as an example. Note that the cover member 300 can also be applied to the airbag 33 in embodiment 1 and the airbag 133 in embodiment 3.

FIG. 19 is a plan view (A) of a structure of a soft cover 300 that can be employed in the side airbag device of the present invention, and airbag (B) in a stowed state (compressed state).

The soft cover 300 encloses the airbag module containing the airbags (34 and 36), the inflator 30, and the brackets 52, 54. Unlike the airbags 33, 133, the soft cover 300 is configured to not require a large amount of strength, in order to tear easily when the airbags (34, 36) deploy, and to not inhibit deployment of the airbags (34, 36).

The soft cover 300 is provided with a pair of first through holes 302a, 302b that engage with the stud bolts 32a, 32b of the inflator 30, and a pair of second through holes 306a, 306b that encircle the folded airbag 133 and are then again engaged with said stud bolts 32a, 32b. A slit 308 is formed between the two second through holes 306a, 306b so that the distance between the second through holes 306a, 306b can be widened.

Additionally, the soft cover 300 has slits 304U, 304L into which the upper and lower portions of the first plate 54 are respectively inserted.

FIGS. 20(A), 20(B), and FIGS. 21(A), 21(B) are explanatory diagrams illustrating the steps of encircling the airbag module with the soft cover 300 according to the present invention. FIG. 22 is an explanatory diagram illustrating the state in which the airbag module is enclosed by the soft cover 300 according to the present invention. FIG. 23 is a cross-sectional view (A) in the B1-B1 direction of FIG. 22, and a cross-sectional view (B) in the B2-B2 direction of FIG. 22.

When the airbag module is enclosed by the soft cover 300, the stud bolts 32a, 32b of the inflator 30 are first passed through (engaged with) the first through-holes 302a and 302b of the soft cover 300, as illustrated in FIG. 20(A).

Next, as illustrated in FIG. 20(B), the airbag module (133, 30) is encircled by the soft cover 300, and then the stud bolts 32a, 32b of the inflator 30 are passed through (engaged with) the second through holes 306a. 306b of the soft cover 300, as illustrated in FIG. 21(A).

Next, as illustrated in FIG. 21(B), the upper end and lower ends of the first plate 54 of the bracket are passed through the slits 304U, 304L. Then, the pre-push chamber side in which the inflator 30 is stowed is pulled toward the second plate 52 and the stud bolts 32a, 32b of the inflator 30 are inserted into the openings formed in the second plate 52 (FIG. 22).

Thus, by providing slits 304U, 304L for inserting the first plate 54 in the soft cover 300, when the airbag module is encircled by the soft cover 300, unnecessary space between the soft cover 300 and airbag module, and between the soft cover 300 and the brackets 52, 54, is reduced, and the compressed airbag 133 can be tightly retained. This is particularly effective when the first and second plates are orthogonal to each other in a cross section perpendicular to the longitudinal direction of the brackets 52, 54, as there is no wasted space between the brackets 52, 54.

FIG. 24 is a cross-sectional view illustrating the airbag according to the present invention in a deployed state, where (A) illustrates the state of deployment in the initial stages, and (B) illustrates deployment in later stages. Note that in FIG. 24, illustration of the seat frame 10 is omitted for convenience of explanation.

In the present invention with the configuration described above, as illustrated in FIG. 24(A), the pre-push chamber 36 deploys inside the side supporting part 12 in an initial activation stage of the airbag device 20, deforms such that a tip end side of the side supporting part 12 bends or protrudes on the vehicle side starting from the region 26 while the seat skin 14 tears from the sewn part 18, and restrains so as to push the occupant inward in the vehicle width direction. When the pre-push chamber 36 is deployed, the surface 52a of the second plate 52 of the bracket acts as a reaction surface.

Deployment of the pre-push chamber 36 causes the front side part of the side support part 12 to protrude toward the occupant side, thereby avoiding or minimizing the generation of forces that would push the occupant diagonally forward from the direction of the back of their body, thereby avoiding movement of the occupant in the direction that the seatbelt is pulled out. In other words, injury to the occupant can be suppressed, and restraining performance can be maximized.

Subsequently, as illustrated in FIG. 24(B), when the airbags (34, 36) are further inflated, the main chamber 34 fully deploys toward the front of the vehicle to protect the occupants in the event of a collision. At this time, the surface 54a of the first plate of the bracket acts as a reaction force surface.

Although the present invention has been described with reference to embodiments, the present invention is not limited in any way to these embodiments, and can be changed as appropriate within the scope of the technical idea of the present invention. For example, while a side airbag on the near side has been predominantly mentioned in the embodiments described above, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device for storage within a vehicle seat and securement to a side frame of the vehicle seat, the side airbag device comprising:
an airbag for restraining an occupant when expanded and deployed;
an inflator for supplying expansion gas to the airbag,
a bracket retaining the airbag and the inflator and for connection to the side frame; and
a flexible cover member covering the airbag when folded, wherein:
the airbag includes a pre-push chamber with the inflator stowed inside and deploys primarily on an occupant side of the side frame, and a main chamber that is connected to the pre-push chamber and deploys primarily toward a front of the side frame, the main chamber partitioned into a forward chamber and a rear chamber, the bracket includes a first surface that faces a forward direction of vehicle travel and a second surface that faces a center side of the vehicle seat in a width direction, and at least the main chamber is arranged adjacent to the first surface of the bracket when the airbag is in a folded and/or rolled stowed state, the first surface of the bracket defines a first reaction surface directly opposing the main chamber in the forward direction of travel upon inflation of the airbag and the second surface defines a second reaction surface directly opposing the pre-push chamber in a lateral direction, and wherein the first surface of the bracket is defined by a first plate and the flexible cover member has slits into which upper and lower portions of the first plate are inserted, respectively.

2. A side airbag device for storage within a vehicle seat and securement to a side frame of the vehicle seat, the side airbag device comprising:

an airbag for restraining an occupant when expanded and deployed;

an inflator for supplying expansion gas to the airbag;

a bracket retaining the airbag and the inflator and for connection to the side frame, the bracket including a first plate defining a first surface that faces a forward direction of vehicle travel and a second surface that faces a center side of the vehicle seat in a width direction; and a flexible cover member covering the airbag when folded, wherein the flexible cover member has slits into which upper and lower portions of the first plate are inserted, respectively.

3. The side airbag device according to claim 2, wherein:

the airbag includes a pre-push chamber with the inflator stowed inside and deploys primarily on an occupant side of the side frame, and a main chamber that is connected to the pre-push chamber and deploys primarily toward a front of the side frame, the main chamber portioned into a forward chamber and a rearward chamber, the bracket includes a first surface that faces a forward direction of vehicle travel and a second surface that faces a center side of the vehicle seat in a width direction, and at least the main chamber is arranged adjacent to the first surface of the bracket when the airbag is in a folded and/or rolled stowed state, the first surface of the bracket defines a first reaction surface directly opposing the main chamber in the forward direction of travel upon inflation of the airbag and the second surface defines a second reaction surface directly opposing the pre-push chamber in a lateral direction, and a reference line at a rear edge of the rear chamber corresponds with an inclination angle at an upper region of the first surface of the bracket.

4. The side airbag device according to claim 3, wherein when in a stowed state, the pre-push chamber of the airbag is arranged on top of the second surface of the bracket.

5. The side airbag device according to claim 3, wherein: the rear chamber is configured such that at least one of a shoulder protecting region that protects a shoulder area, and a waist protecting region that protects a waist area, respectively of an occupant seated in the vehicle seat, reaches near a front end of the forward chamber.

6. The side airbag device according to claim 5, wherein the bracket includes a plate-shaped first plate with having the first surface and a plate-shaped second plate having the second surface, and the inflator is secured to the second plate.

7. The side airbag device according to claim 6, wherein the first plate of the bracket and the second plate of the bracket are nearly orthogonal to one another.

8. The side airbag device according to claim 6, wherein the rear chamber is configured such that the shoulder protecting region that protects the shoulder area of the occupant seated in the vehicle seat, reaches near a front end part of the forward chamber;

the shoulder protecting region of the airbag is tucked in or folded toward a center of the main chamber using a first line as a crease, which is orthogonal to the reference line and extends from near the front end part of the shoulder protecting region to near a rear end of the rear chamber;

the airbag is folded or rolled from a front end side to a rear end side in a direction of the first line;

and the reference line is arranged along the first surface of the first plate when the airbag is retained on the bracket.

9. The side airbag device according to claim 8, wherein the folded or rolled lower end part of the airbag is further folded upwardly into a Z-shaped cross section with a second line and a third line that are parallel to the first line as creases.

10. The side airbag device according to claim 6, wherein the rear chamber is configured such that the waist protecting region that protects the waist area of the occupant seated in the vehicle seat, reaches near a front end part of the forward chamber;

a lower end part of the waist protecting region of the airbag is tucked in or folded toward a center of the main chamber using a fourth line as a crease, which extends from near the front end part of the waist protecting region to near rear end of the rear chamber;

the tucked in or folded lower end part of the airbag is folded upwardly into a Z-shaped cross section so that a fifth line, which is orthogonal to the reference line, becomes the fold of a bottom edge;

the airbag is folded or rolled along the fifth line from a front end side to a rear end side; and the reference line is arranged along the first surface of the first plate when the airbag is retained on the bracket.

11. The side airbag device according to claim 10, wherein the airbag is folded with an upper end part towards the center of the main chamber using a sixth line that is parallel to the fifth line as a crease, before being folded or rolled.

12. The side airbag device according to claim 6, wherein the rear chamber is configured such that the waist protecting region that protects the waist area of the occupant seated in the vehicle seat, reaches near a front end part of the forward chamber;

a lower end part of the waist protecting region of the airbag is tucked in or folded toward a center of the main chamber using a fourth line as a crease, which extends from near the front end part of the waist protecting region to near a rear end of the rear chamber;

the airbag is folded or rolled along the fourth line from a front end side to a rear end side; and the reference line is arranged along the first surface of the first plate when the airbag is retained on the bracket.

13. The side airbag device according to claim 12, wherein an upper end part of the airbag is folded towards the center of the main chamber using a seventh line that extends in a front-rear direction as a crease, before being folded or rolled.

14. The side airbag device according to claim 13, wherein when a point is the point where the reference line and a front edge of the folded or rolled region intersect, a region forward of the reference line is folded rearward using an eighth line, which is orthogonal to the seventh line, as a crease.

15. The side airbag device according to claim 14, wherein the flexible cover member has a first through-hole to be engaged with a stud bolt of the inflator and a second through-hole to be circled around the airbag when folded and again engaged with the stud bolt.

16. A vehicle seat provided with the side airbag device according to claim 2.

17. The side airbag device according to claim 3, wherein the airbag is deployable such that the pre-push chamber is on a first lateral side of a partitioning part and partially rearward of the second surface, and the main chamber is on a second lateral side of the partitioning part and completely forward of the second surface.

\* \* \* \* \*